United States Patent
Kaimalettu et al.

(10) Patent No.: US 10,318,475 B2
(45) Date of Patent: Jun. 11, 2019

(54) SYSTEM AND METHOD FOR PERSISTENCE OF APPLICATION DATA USING REPLICATION OVER REMOTE DIRECT MEMORY ACCESS

(71) Applicant: ORACLE INTERNATIONAL CORPORATION, Redwood Shores, CA (US)

(72) Inventors: Arun Kaimalettu, Bangalore (IN); Margaret Susairaj, Houston, TX (US); Sumanta Chatterjee, Fremont, CA (US); Joseph Francis Therrattil Koonen, Bangalore (IN); Richard Frank, Naples, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 260 days.

(21) Appl. No.: 14/749,503

(22) Filed: Jun. 24, 2015

(65) Prior Publication Data
US 2016/0378713 A1    Dec. 29, 2016

(51) Int. Cl.
*G06F 15/16* (2006.01)
*G06F 15/173* (2006.01)
(Continued)

(52) U.S. Cl.
CPC ........ *G06F 15/17331* (2013.01); *G06F 3/065* (2013.01); *G06F 3/067* (2013.01); *G06F 3/0619* (2013.01); *H04L 67/1008* (2013.01)

(58) Field of Classification Search
CPC ............ G06F 15/17331; G06F 3/0619; G06F 3/065; G06F 3/067; H04L 67/1008
(Continued)

(56) References Cited

U.S. PATENT DOCUMENTS

| 7,320,088 | B1 | 1/2008 | Gawali | |
| 7,418,621 | B2 * | 8/2008 | Ashmore | ............ G06F 11/1076 711/114 |

(Continued)

OTHER PUBLICATIONS

"Oracle® Fusion Middleware Administering WebLogic Server for Oracle Exalogic Elastic Cloud 12c (12.1.3)", Oracle, Jul. 2014, 50 pages.

(Continued)

*Primary Examiner* — Thuong Nguyen
(74) *Attorney, Agent, or Firm* — Tucker Ellis LLP

(57) ABSTRACT

In accordance with an embodiment, described herein is a system and method for enabling persistence of application data, using replication over a remote direct memory access (RDMA) network. In an enterprise application server or other environment having a plurality of processing nodes, a replicated store enables application data to be written using remote direct memory access to the random access memory (RAM) of a set of nodes, which avoids single points of failure. Replicated store daemons allocate and expose memory to client applications via network endpoints, at which data operations such as reads and writes can be performed, in a manner similar to a block storage device. Resilvering can be used to copy data from one node to another, if it is determined that the number of data replicas within a particular set of nodes is not sufficient to meet the persistence requirements of a particular client application.

20 Claims, 12 Drawing Sheets

(51) Int. Cl.
  *G06F 3/06* (2006.01)
  *H04L 29/08* (2006.01)

(58) Field of Classification Search
  USPC .......................................................... 709/212
  See application file for complete search history.

(56) References Cited

U.S. PATENT DOCUMENTS

| | | | |
|---|---|---|---|
| 7,643,468 | B1 | 1/2010 | Arregoces et al. |
| 3,003,144 | A1 | 4/2015 | Hayes et al. |
| 9,037,818 | B1 | 5/2015 | Natanzon et al. |
| 9,053,167 | B1 | 6/2015 | Swift et al. |
| 2002/0052914 | A1* | 5/2002 | Zalewski ............... G06F 9/5077 709/203 |
| 2008/0028009 | A1 | 1/2008 | Ngo |
| 2009/0024817 | A1* | 1/2009 | Oved ........................ G06F 13/28 711/170 |
| 2009/0089313 | A1* | 4/2009 | Cooper ............. G06F 17/30306 |
| 2010/0198985 | A1* | 8/2010 | Kanevsky ............... H04L 45/02 709/241 |
| 2010/0274762 | A1 | 10/2010 | Murphy et al. |
| 2011/0302583 | A1 | 12/2011 | Abadi et al. |
| 2012/0023209 | A1 | 1/2012 | Fletcher et al. |
| 2013/0094615 | A1 | 4/2013 | Falco et al. |
| 2015/0269041 | A1 | 9/2015 | Long et al. |
| 2015/0381725 | A1* | 12/2015 | Haapaoja ............ H04L 67/1097 709/213 |

OTHER PUBLICATIONS

"Oracle® Fusion Middleware Administering WebLogic Server for Oracle Exalogic Elastic Cloud 12c (12.1.3)"; Chapter 3: "Using the WebLogic Replicated Store for WebLogic Server Messaging Services", downloaded from https://docs.oracle.com/middleware/1213/wls/WLEXA/rs.htm on Dec. 3, 2014, 19 pages.

"Oracle® Fusion Middleware Administering Server Environments for Oracle WebLogic Server 12.1.3", Oracle, Aug. 2015, 98 pages.

"Oracle® Fusion Middleware Administering Server Environments for Oracle WebLogic Server 12.1.3"; Chapter 6: "Using the WebLogic Persistent Store", downloaded from https://docs.oracle.com/middleware/1213/wls/CNFGD/store.htm on Dec. 3, 2014, 30 pages.

"Oracle WebLogic Server 12.1.3 is Released", Will Lyons, Jun. 26, 2014, downloaded from https://blogs.oracle.com/WebLogicServer/entry/oracle_weblogic_server on Dec. 3, 2014, 2 pages.

"Oracle Cloud Control Help for WebLogic Server 12c (12.1.3): Create Replicated Stores", downloaded from https://docs.oracle.com/middleware/1213/wls/WLACH/taskhelp/stores/ on Dec. 3, 2014, 2 pages.

"Block (data storage)", downloaded from https://en.wikipedia.org/wiki/Block_(data_storage) on Jun. 2, 2016, 1 page.

United States Patent and Trademark Office, Office Action dated Jan. 31, 2018 for U.S. Appl. No. 14/849,262, 22 Pages.

United States Patent and Trademark Office, Office Action dated Jul. 31, 2017 for U.S. Appl. No. 14/849,262, 17 Pages.

United States Patent and Trademark Office, Office Action dated Sep. 5, 2018 for U.S. Appl. No. 14/849,262, 23 Pages.

United States Patent and Trademark Office, Office Action dated Dec. 7, 2016 for U.S. Appl. No. 14/849,262, 13 Pages.

\* cited by examiner

US 10,318,475 B2

SYSTEM AND METHOD FOR PERSISTENCE OF APPLICATION DATA USING REPLICATION OVER REMOTE DIRECT MEMORY ACCESS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to data processing, and are particularly related to systems and methods for enabling persistence of application data, using replication over a remote direct memory access network.

BACKGROUND

A typical enterprise application server environment supports the deployment of software applications to a cluster of processing nodes. To provide high-availability in the event of abnormal application or node behavior, a particular application may require its data to be persisted in some manner, which in turn typically requires the use of a backend filesystem or similar persistent storage medium that is accessible to all of the nodes.

However, the above approach generally does not scale well with increasing number of processing nodes. For example, a set of nodes may attempt to persist data to the backend filesystem at a rate that collectively exceeds the maximum rate at which the filesystem can actually write the data. In such situations, adding yet more nodes to the cluster provides little benefit, since the applications must wait for the backend filesystem to complete its write operations.

SUMMARY

In accordance with an embodiment, described herein is a system and method for enabling persistence of application data, using replication over a remote direct memory access (RDMA) network. In an enterprise application server or other environment having a plurality of processing nodes, a replicated store enables application data to be written using remote direct memory access to the random access memory (RAM) of a set of nodes, which avoids single points of failure. Replicated store daemons allocate and expose memory to client applications via network endpoints, at which data operations such as reads and writes can be performed, in a manner similar to a block storage device. Resilvering can be used to copy data from one node to another, if it is determined that the number of data replicas within a particular set of nodes is not sufficient to meet the persistence requirements of a particular client application.

DETAILED DESCRIPTION

As described above, in a typical enterprise application server environment which supports the deployment of software applications to a cluster of processing nodes, a particular application may require its data to be persisted in some manner, which in turn requires the use of a backend filesystem or persistent storage that is accessible to all of the nodes. However, such approach generally does not scale well with increasing number of nodes.

Replicated Store

In accordance with an embodiment, described herein is a system and method for enabling persistence of application data, using replication over a remote direct memory access (RDMA) network. In an enterprise application server or other environment having a plurality of processing nodes, a replicated store (cloudstore) enables application data to be written using remote direct memory access to the random access memory (RAM) of a set of nodes.

Figure 1:
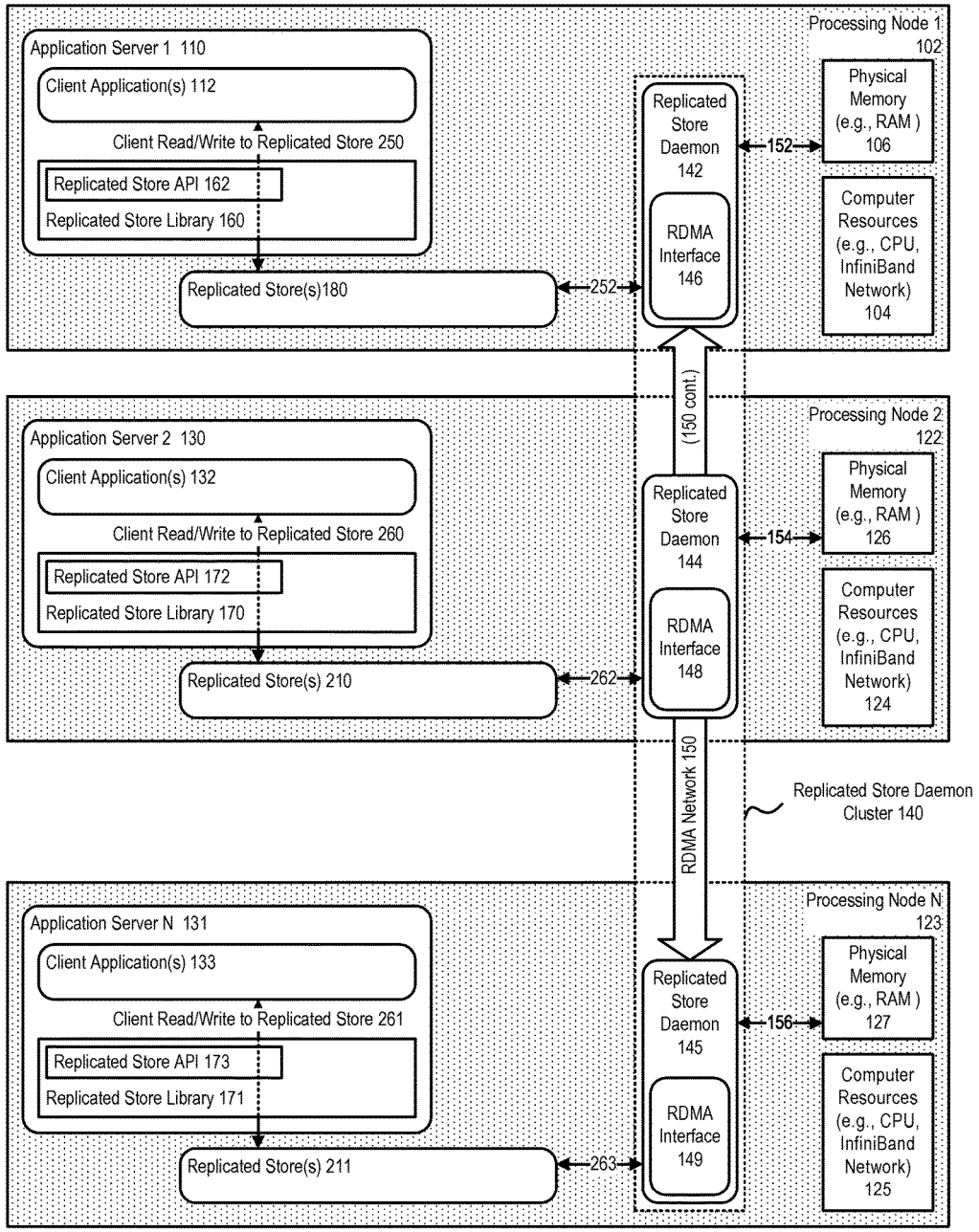
FIG. 1 illustrates a system for persistence of application data using replication over a remote direct memory access network, in accordance with an embodiment.

FIG. 1 illustrates a system for persistence of application data using replication over a remote direct memory access network, in accordance with an embodiment.

As shown in FIG. 1, in accordance with an embodiment, a computer system (e.g., an Oracle Exalogic system) can include a plurality of processing nodes (e.g., a plurality of Oracle Exalogic nodes) such as, for example, processing node 1 (102), processing node 2 (122), and processing node N (123), each of which includes one or more physical or hardware computer components or resources 104, 124, 125, for example, one or more processor/CPU, or InfiniBand network components, and physical or hardware volatile memory (e.g., RAM) 106, 126, 127.

In accordance with an embodiment, each processing node supports the execution of one or more application server instances 110, 130, 131 (e.g., Oracle WebLogic server instances), wherein each application server instance supports the execution of one or more client software applications (client applications, clients) 112, 132, 133.

In accordance with an embodiment, a replicated store daemon cluster (daemon cluster) 140, comprises a plurality of replicated store daemons (RS daemons, daemons), including an RS daemon 142, 144, 145 operating at and associated with each processing node. Each RS daemon includes an RDMA interface 146, 148, 149, which provides access to an RDMA over InfiniBand network (RDMA network) 150, and enables read/write access 152, 154, 156, to that associated node's physical memory. The daemons can allocate and expose node memory to clients via network endpoints, at which data operations such as reads and writes can be performed by client applications, in a manner similar to the use of a block storage device.

In accordance with an embodiment, each application server can include a replicated store library 160, 170, 171, and replicated store application program interface (API) 162, 172, 173, which enables access by that application server's client applications to one or more replicated stores 180, 210, 211.

Client applications can read and write data 250, 260, 261, to a local replica of a particular replicated store, or, via a remote RS daemon, to another (remote) replica of that replicated store within the cluster. Each of the replicated store replicas can also be accessed 252, 262, 263, by an associated RS daemon using RDMA reads and writes to transfer replicated store data between local and remote nodes, and to persist the data to a node's physical memory.

Figure 2:
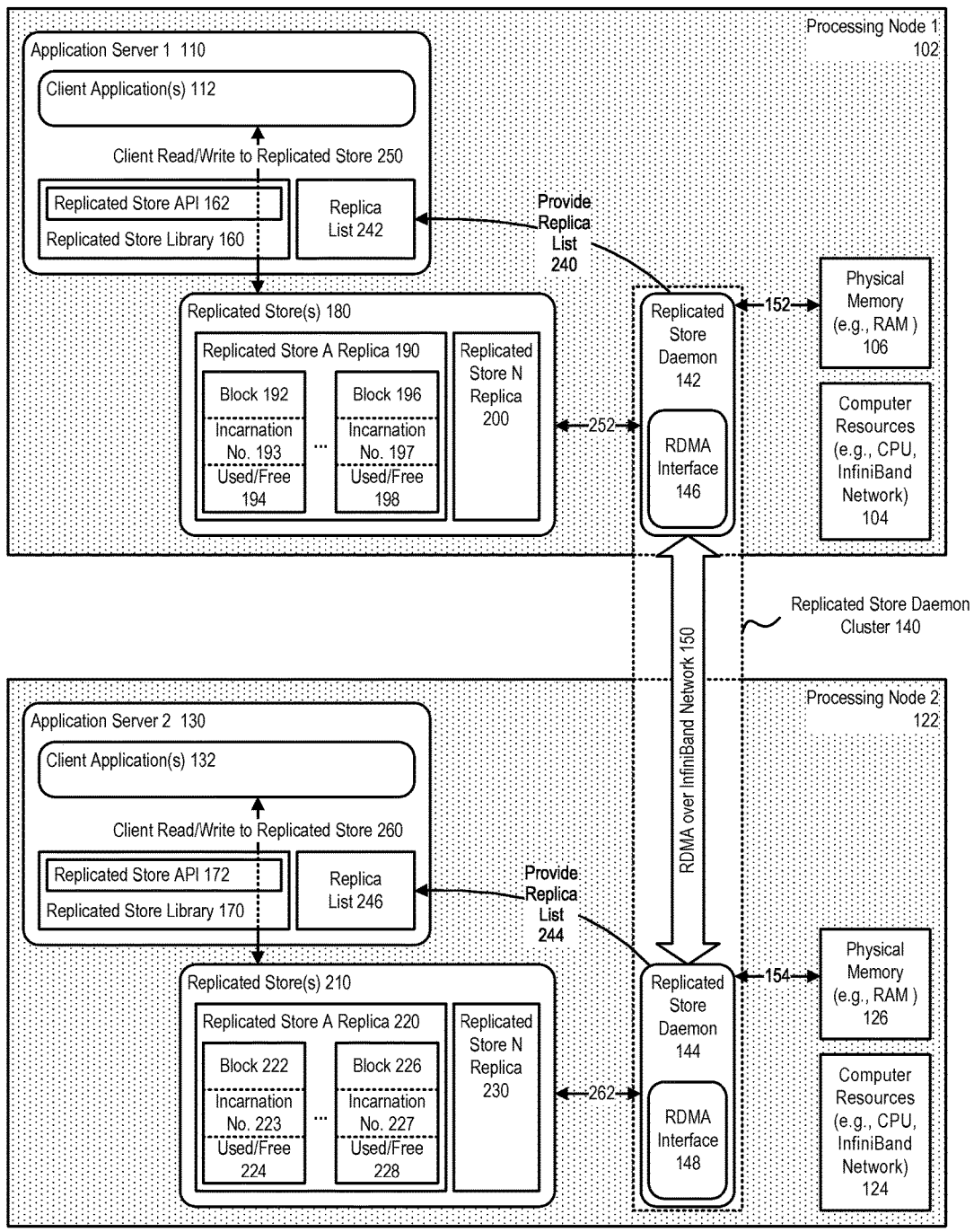
FIG. 2 further illustrates a system for persistence of application data, in accordance with an embodiment.

FIG. 2 further illustrates a system for persistence of application data, in accordance with an embodiment.

In accordance with an embodiment, each replicated store includes one or more copies or replicas, wherein each replica is a chunk of memory that can be exposed to, and used by, a client application process (client process). Individual replicas can also be associated with their own particular properties, such as, for example, block size, level of replication, and access rights.

For example, in a WebLogic application server environment, a WebLogic replicated store can include one or more replicas similar to File Store files, or JDBC Store tables, which can be safely accessed by a single client process at a time, for use by that client process. As further described below, in some situations a locking procedure can be used to prevent more than one client from accessing a particular replica at a particular time.

In accordance with an embodiment, a replicated store uses replication to provide a layer (replication store layer) of persistence to the otherwise volatile memory resources, so that application data can be made available on two or more different processing nodes at any given time. Whenever data is written by a client to a particular replicated store replica, that data can also be updated within one or more other replicas of the replicated store.

In accordance with an embodiment, whenever data is requested to be read by a client from a particular replicated store, the read operation can be optimized to retrieve the data from a particular replica which is closest to the requesting client.

As shown in FIG. 2, in accordance with an embodiment (which for purposes of illustration shows two processing nodes, although a similar approach can be used with greater numbers of nodes), each replicated store library can be associated with a replicated store application program interface (API) which enables access by client applications to a replicated store replica.

In accordance with an embodiment, a replicated store which is accessible by a client application can be replicated across a cluster, to provide high availability. Each node of the cluster can include a local copy or replica of many replicated stores. A particular replicated store, for example replicated store 180, associated with a first application server instance, can include a plurality of replicas, including in this example, replicated store A replica 190, and replicated store N replica 200. Each replica can store its data according to a data layout, including a plurality of blocks 192, 196, with associated incarnation numbers 193, 197, and used/free indicators 194, 198.

Similarly, another replicated store, such as replicated store 210, associated with a second or other application server instance, can likewise include a plurality of replicas, including in this example, a copy of replicated store A replica 220, and a copy of replicated store N replica 230, wherein each copy of a replica similarly includes a data layout having a plurality of blocks 222, 226, with associated incarnation numbers 223, 227, and used/free indicators 224, 228.

In accordance with an embodiment, the system is configured so that each replicated store maintains replicas of its application data on two or more processing nodes, and monitors those nodes to determine that their replicas are online. If one node fails, then the replicated store dynamically chooses a new node to keep a replica, and copies data from any surviving nodes to the new node. Each RS daemon is also configured to provide 240, 244 an associated application server instance with a current or updated replica list 242, 246 upon request. When a client accesses a remote replica of a replicated store, it does not communicate with the remote application server, but instead communicates with the remote RS daemon.

Client applications also have the option of selecting a higher level of redundancy, to ensure that at least n copies of data are present at any particular time, and can require that a replicated store operates only when a certain level of data redundancy is provided. In such environments, the system can suspend write operations on a particular replicated store if the system determines it cannot host sufficient replicas of the replicated store as requested by client.

In accordance with an embodiment, while the contents of a replicated store generally reside in the volatile memory of individual processing nodes, some metadata can also be stored in a traditionally-persisted backend storage shared across all of the nodes participating in the replicated store, for example a network file system (NFS) where the replicated store can create or open files from all nodes. This location can be used, for example, to store configuration metadata related to replicated stores and other runtime files; to operate a locking procedure to control access to individual stores; and/or to provide a heartbeat procedure to detect node failures.

Figure 3:
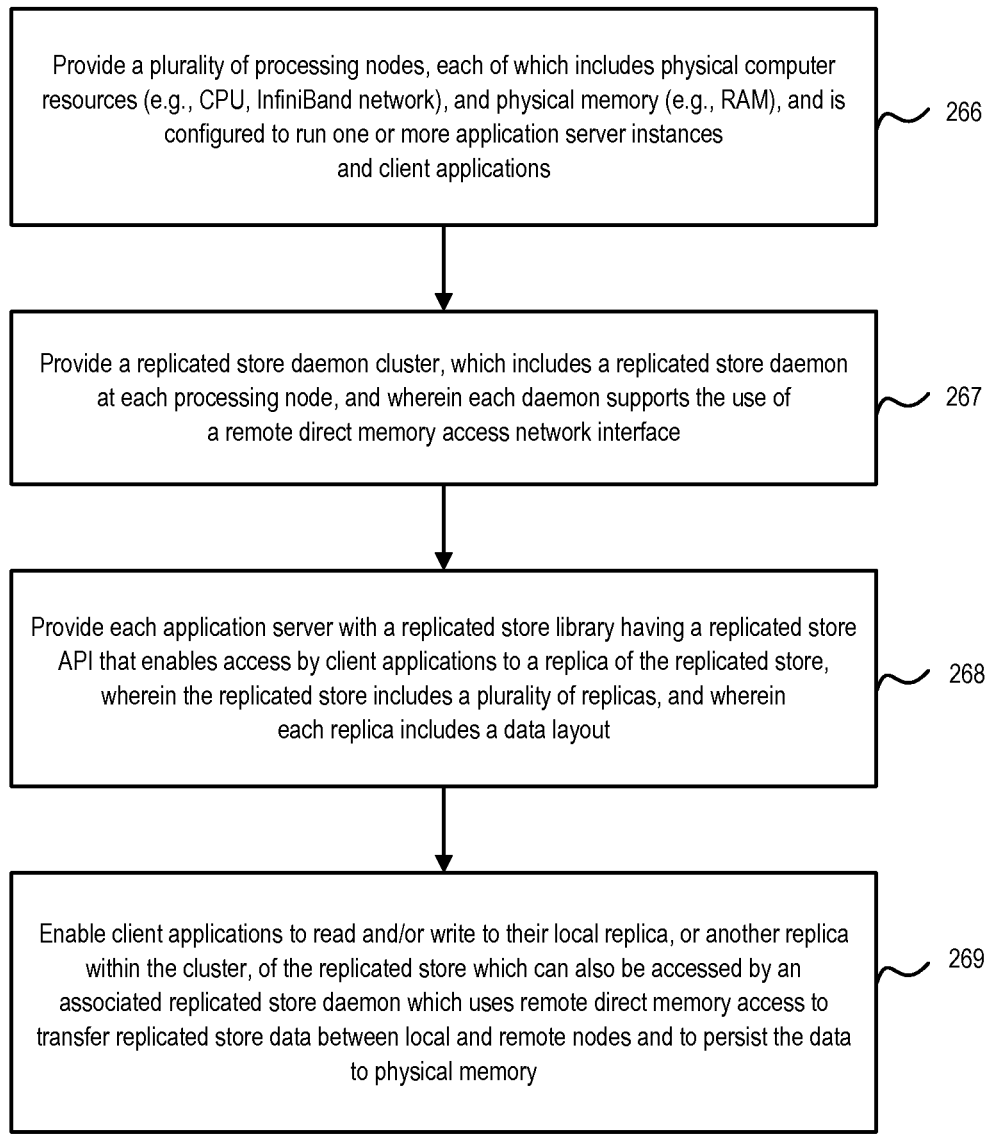
FIG. 3 illustrates a method of providing persistence of application data using replication over a remote direct memory access network, in accordance with an embodiment.

FIG. 3 illustrates a method of providing persistence of application data using replication over a remote direct memory access network, in accordance with an embodiment.

As shown in FIG. 3, at step 266, a plurality of processing nodes are provided, each of which includes physical computer resources (e.g., CPU, InfiniBand network), and physical memory (e.g., RAM), and is configured to run one or more application server instances and client applications.

At step 267, a daemon cluster is provided, which includes an RS daemon at each processing node, and wherein each daemon supports the use of a remote direct memory access (RDMA) network interface.

As step 268, each application server is provided with a replicated store library having a replicated store API that enables access by client applications to a replica of the replicated store, wherein the replicated store includes a plurality of replicas, and wherein each replica includes a data layout.

At step 269, client applications are enabled to read and/or write to their local replica, or another replica within the cluster, of the replicated store, which can also be accessed by an associated RS daemon which uses RDMA to transfer replicated store data between local and remote nodes, and to persist the data to physical memory.

Replicated Store (RS) Daemons

As described above, in accordance with an embodiment, a daemon cluster includes a plurality of RS daemons, including a daemon operating at and associated with each processing node of the application server environment, cloud, or other enterprise environment. Each RS daemon includes an RDMA interface, which provides access to an RDMA over InfiniBand network and enables read/write access to the associated node's physical memory. The daemon cluster presents a replicated memory storage that spans multiple nodes, and is managed by one or more RS daemons.

In accordance with an embodiment, each RS daemon can provision memory and network resources for access by and/or from other nodes, including listening at a predetermined network address to receive requests from clients or other nodes. Upon receiving a request, a daemon allocates memory from its associated node, and exposes the allocated memory to the client process through a separate network endpoint by which data operations (e.g., read, write, or resize) can be performed.

In some situations, the replicated store may optimize local transfer of data (i.e., transfer within a same processing node) using shared memory, in which case the network endpoint can operate as a helper process to bootstrap the shared memory access.

In accordance with an embodiment, each RS daemon process can execute multiple threads. A main thread can be used to monitor the network endpoint that client processes will use, and services any requests arriving via that endpoint. Operations within the replicated store can be designed so that no portion of a request's completion unduly blocks the main thread.

For example, if a step requires arbitrary waiting, such as waiting for a network or IO operation to complete, then the waiting can be performed in an asynchronous fashion, so that once the asynchronous processing is completed, the main thread can complete and respond back to the client.

In accordance with an embodiment, each operation can be performed in such a way that another RS daemon in the replicated store can also start a similar operation, including allowing multiple operations on same resources to proceed in parallel by different RS daemons. In those situations in which only one of the clients is expected to operate successfully, a replicated store locking procedure can be used.

In accordance with various embodiments, other threads can also be spawned by the system to perform additional work, such as, for example:

Monitor an unsecured endpoint, authenticate a client and redirect to a secured endpoint by, for example, manning a predetermined network endpoint to which any client can connect, checking for an appropriate secret to authenticate the client, and upon success passing details regarding a secured endpoint.

Write disk-based heartbeats periodically, to a quorum file, for example as a heartbeat counter which is incremented after every write. The quorum file can reside in a global repository which can be read and written to by any RS daemon, and can be partitioned in blocks, with each block allocated to different daemons, so that each daemon writes its heartbeat to its designated block. To check whether other daemons are alive, a daemon can read the entire quorum file and check each block.

Read heartbeat files and update in-memory information about each RS daemon, for example by reading the quorum file to check for heartbeats from other nodes. If the heartbeat counter for a remote daemon is changed from a previous time it was read, then it is an indication that the remote daemon was alive during the time period. Alternatively, the remote daemon can be declared dead, which can trigger a store resilvering to maintain high availability of those replicated stores that were associated with the dead daemon.

Send and receive heartbeats using network interface and node monitoring, for example by each RS daemon sending network heartbeat messages to all other daemons at fixed intervals. If disk-based heartbeats are affected because of an NFS problem, the system can trust the network heartbeats during that period.

Provide a node-wide time keeper, including periodically determining the time of day, and placing that information in shared memory, for use by the entire replicated store layer.

Replicated Store Locking

As described above, in situations in which only one of the clients is expected to operate successfully, a replicated store locking procedure can be used.

For example, in a cloud environment, the clients for a particular replica can be running on any processing node within a cloud, and it may be desirable in some situations to restrict only one node to access a particular resource at a particular time.

In accordance with an embodiment, this can be performed using a locking procedure, including the use of two types of files:

The first file type is a "lock file" (e.g., <storename>_<host_ip>_<local_daemon_pid>.f), which is a regular file that contain details about the RS daemon and the client opening the replicated store. If multiple daemons try to open the same store, these files will be created with unique names.

The second file type is a "lock link file" e.g., (<storename>_lock.f), which is a link file.

In accordance with an embodiment, a check is first made as to whether a client process has already opened the replica using a lock link file. If a lock link file exists, then the lock link file points to a lock file created by an RS daemon. If the daemon that created the lock file is no longer active, then the lock can be cleared. Otherwise, a determination can be made as to whether the client process that had opened the replica is still alive; if not the lock is cleared, and a lock file is created including details about the daemon and the client process trying to perform the locking. The lock link file can then be linked to the lock file in an exclusive mode, so that the client process now has the lock and can proceed to create or open the replica.

In accordance with an embodiment, a pseudo code to perform a replica locking is illustrated in Listing 1:

Listing 1

1. Check if a client process has already opened the replica using a lock link file.
2. If the lock link file exists, then proceed to (step 3).

Listing 1

3. The lock link file points to a lock file created by an RS daemon, so check if the RS daemon that created the lock file is still active.
4. If the RS daemon that created the lock file is no longer active, then clear the lock and proceed to (step 8).
5. Else { check with the remote RS daemon if the client process that had opened the replica is still alive.
6. If the client process that had opened the replica is alive, then fail the operation.
7. Else clear the lock and proceed to (step 9) }.
8. Else:
9. Create a lock file, and include within the lock file details about the RS daemon and the client process that is trying to perform the locking.
10. Attempt to link the lock link file to the lock file in exclusive mode.
11. If the attempt to link the lock link file to the lock file in exclusive mode fails, then some other node has created the lock file after the current RS daemon has executed (step 1), so fail the operation.
12. If the linking succeeds, then the client process has the lock and can proceed to create or open the replica.

Writing of Data to a Replicated Store

Figure 4:
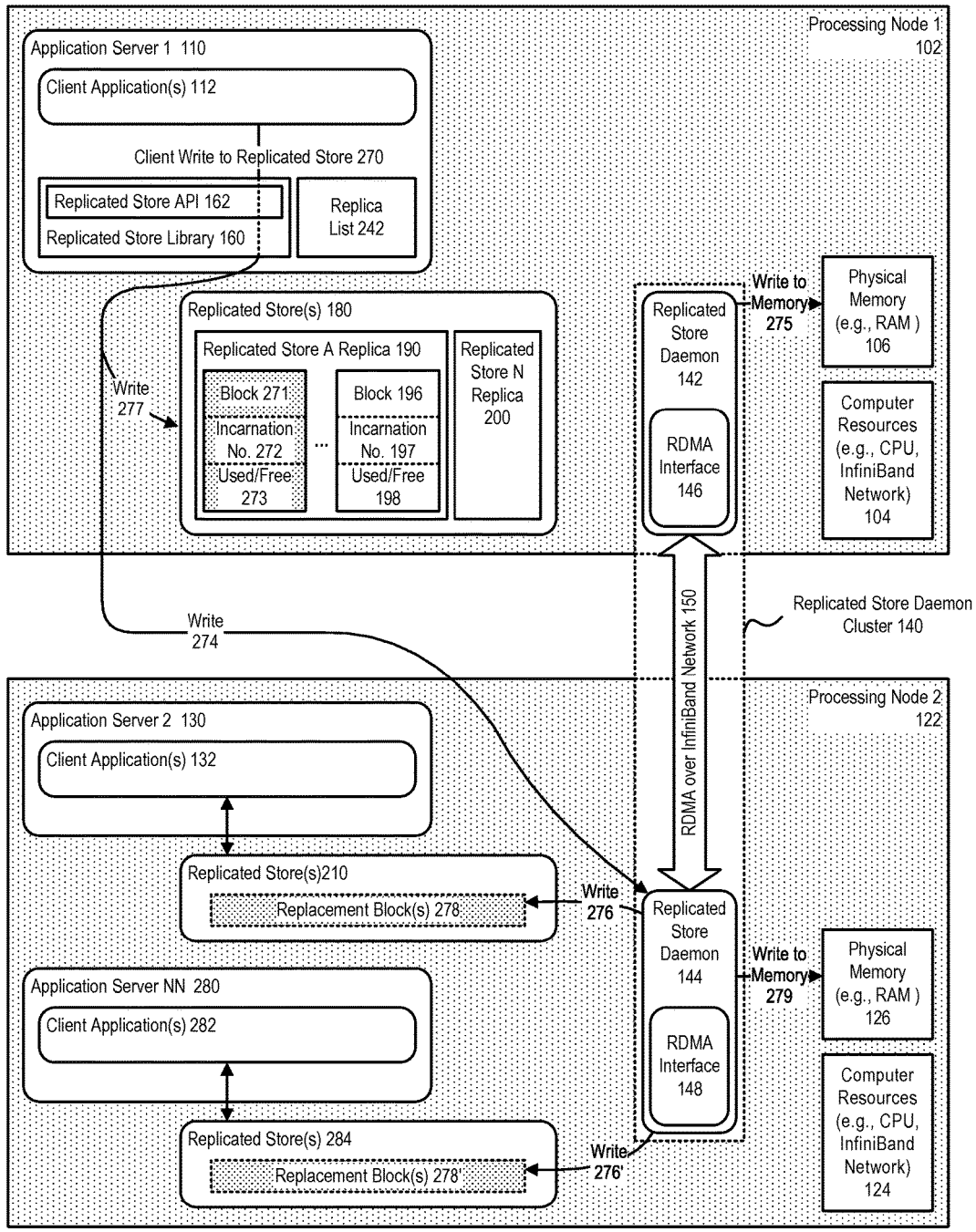
FIG. 4 further illustrates a system for persistence of application data, including writing of data, in accordance with an embodiment.

FIG. 4 further illustrates a system for persistence of application data, including writing of data, in accordance with an embodiment.

As shown in FIG. 4, in accordance with an embodiment, when a client application writes data 270, to a particular block 271 of the replicated store, the writes are directly sent 274 by the replicated store library to any remote daemons, using RDMA, as one or more replacement blocks at both the local and other replicas of the replicated store, including persisting those blocks to physical memory 275, 279. The incarnation number 272 associated with that block (and its replica) is updated, together with its used/free indicator 273. Any writes originating from a client will also result in a local memory update if there is a local replica and an RDMA request is sent to a remote daemon to write to the remote replicas.

For example, as shown in FIG. 4, the RS daemons can write 276, 276' replacement blocks 278, 278' to application server 2 and its replicated store, and also to application server NN 280, which similarly includes applications 282 and replicated store 284, and which similarly can be accessed by an associated RS daemon. The write originating from the client also results in a local memory update 277 if there is a local replica.

In accordance with an embodiment, from the perspective of a client, during a replicated store open operation, information describing the current replicas and the latest block incarnations is passed to the client. A check is made as to whether the latest replica list on the RS daemon is the same as that which the client has, and if not then the latest list is retrieved from the daemon. The replica incarnation number is incremented, and the write block sent from a user-provided buffer to all replicas with the new incarnation number, via RDMA.

In accordance with an embodiment, a pseudo code to perform the writing from the perspective of the client is illustrated in Listing 2:

Listing 2

1. Check if the latest replica list on the RS daemon is same as that which the client has.
2. If the latest replica list on the RS daemon is not the same as that which the client has, then get the latest list from the RS daemon.
3. Increment the replica incarnation number.

Listing 2

4. Send the write block to all replicas with the new incarnation number, via RDMA, from a user-provided buffer.
5. Return to the client process.
6. Client process calls wait.
7. Wait for hardware/software acknowledgement from each of the replicas.
8. When all acknowledgement are received, fire the callback to tell the client process that the write has completed.
9. In the case of multiblock writes, repeat (steps 3-4) for each of the blocks to be written.

In accordance with an embodiment, from the perspective of the replicated store, writing of data includes monitoring each incoming message for a replica-specific endpoint, checking the block incarnation number of the incoming message and, if the block incarnation number is less than a current block incarnation number for the block recorded in the index table, then ignoring it since a newer block is already there (which can happen if a resilvering operation is in progress). The index table entry, such as pointer and incarnation number for the block, can be replaced with the new details, and the freed/old block posted back to the network endpoint, to receive another incoming message.

In accordance with an embodiment, a pseudo code to perform writing from the perspective of the replicated store is illustrated in Listing 3:

Listing 3

1. Monitor each incoming message for a replica-specific endpoint.
2. Check the block incarnation number of the incoming message and, if it is less than a current block incarnation number for the block recorded in the index table, then ignore it since a newer block is already there.
3. Check basic validations, and if all pass then proceed to (step 4), else reply with an error to the client process.
4. Replace index table entry, such as pointer and incarnation number, for the block with the new details.
5. Post freed/old block back to the network endpoint so that it can receive another incoming message.
6. Send an acknowledgement back to the client process.

Figure 5:
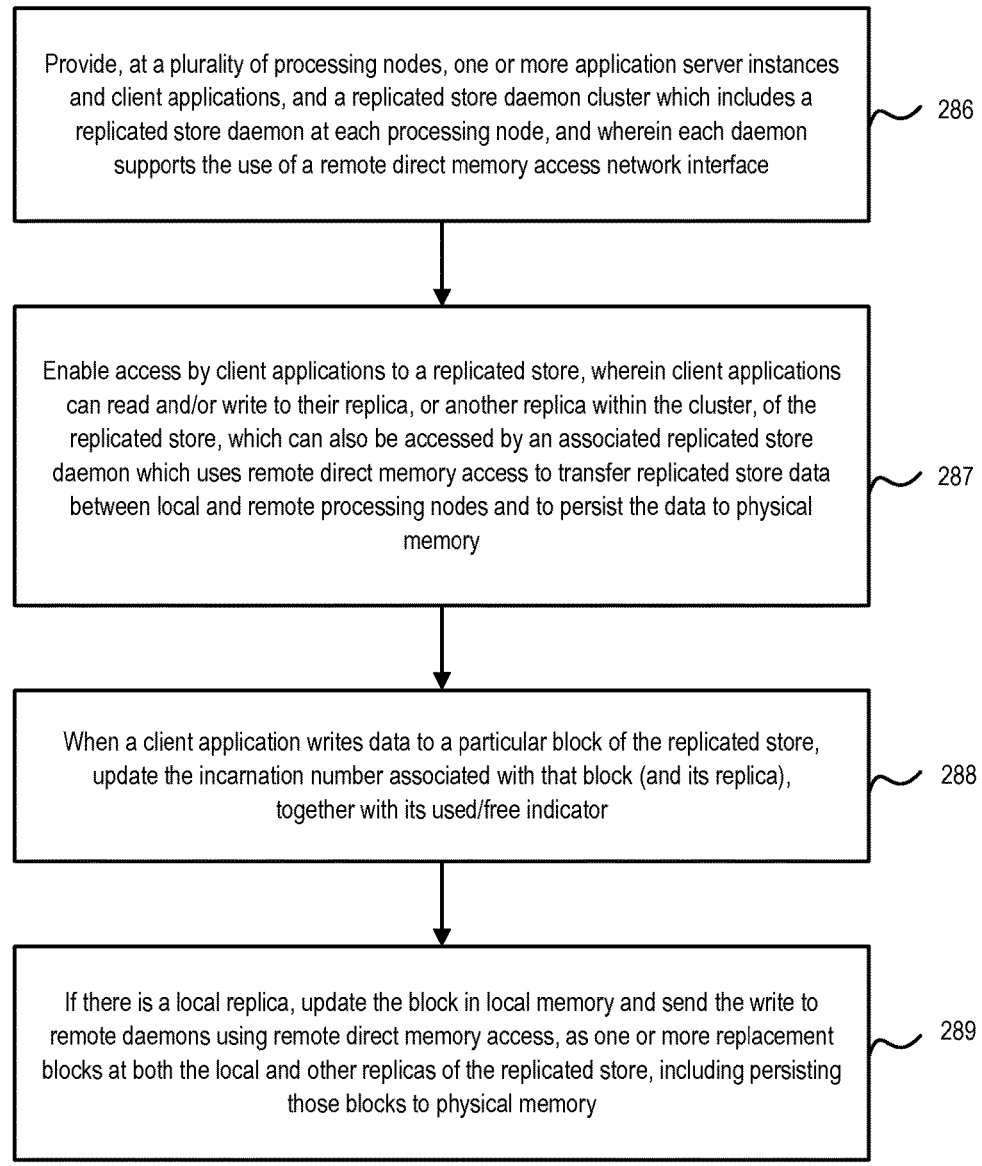
FIG. 5 illustrates a method of providing persistence of application data, including writing of data, in accordance with an embodiment.

FIG. 5 illustrates a method of providing persistence of application data, including writing of data, in accordance with an embodiment.

As shown in FIG. 5, at step 286, one or more application server instances and client applications are provided at a plurality of processing nodes, and a daemon cluster which includes an RS daemon at each processing node, and wherein each RS daemon supports the use of an RDMA network interface.

At step 287, access by client applications to a replicated store is enabled, wherein client applications can read and/or write to their replica, or another replica within the cluster, of the replicated store, which can also be accessed by an associated RS daemon which uses RDMA to transfer replicated store data between local and remote processing nodes and to persist the data to physical memory.

At step 288, when a client application writes data to a particular block of the replicated store, the incarnation number associated with that block (and its replica) is updated, together with its used/free indicator.

At step 289, if there is a local replica, the block is updated in local memory and the write is sent to remote RS daemons using RDMA, as one or more replacement blocks at both the local and other replicas of the replicated store, including persisting those blocks to physical memory.

Reading of Data from a Replicated Store

Figure 6:
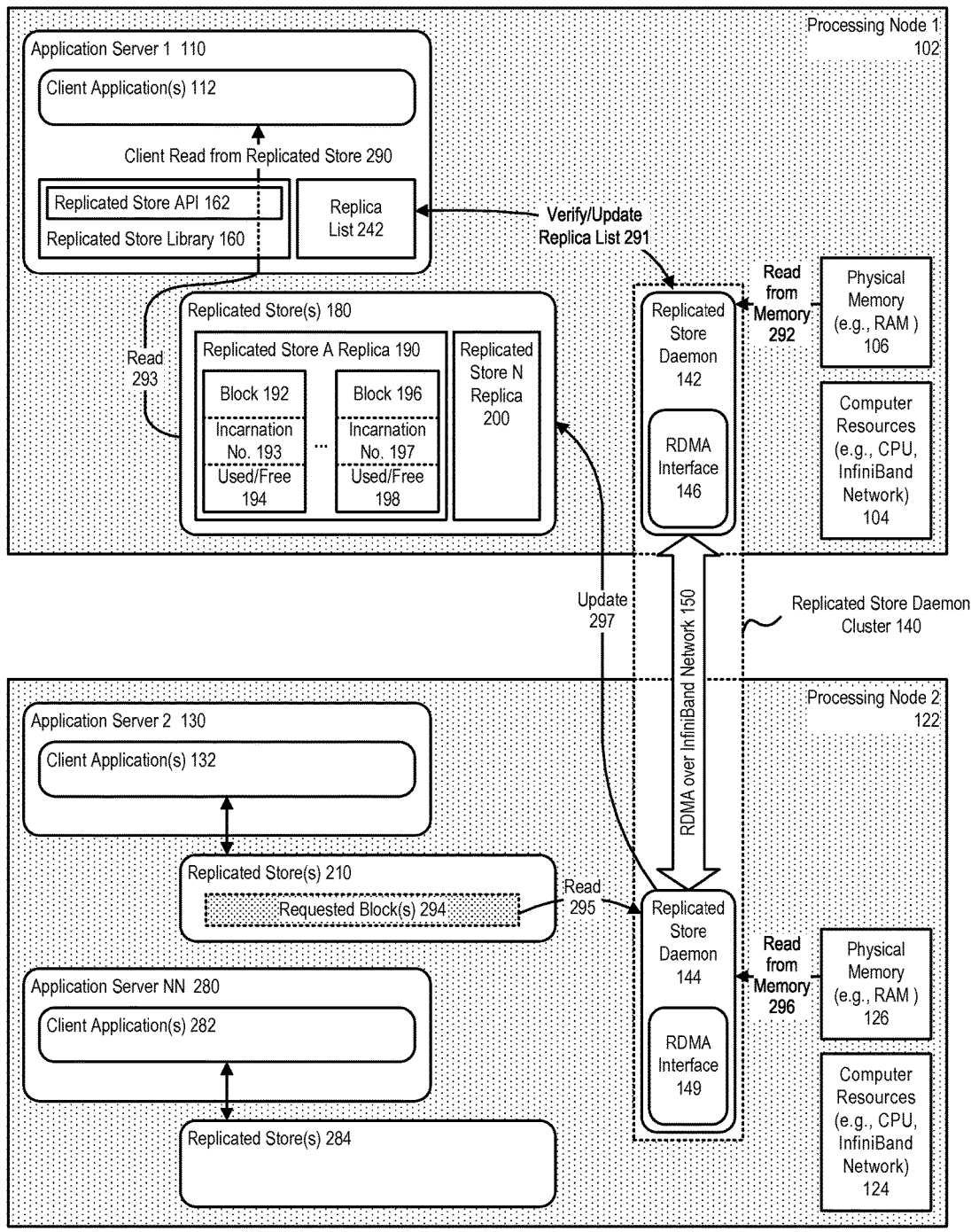
FIG. 6 further illustrates a system for persistence of application data, including reading of data, in accordance with an embodiment.

FIG. 6 further illustrates a system for persistence of application data, including reading of data, in accordance with an embodiment.

As shown in FIG. 6, in accordance with an embodiment, when a client application reads 290 data from its replicated store, a verification is first made as to whether the client's replica list is current, and if not then an updated replica list can be provided 291. The client can then read the data 292, 293 from its local replicated store.

Alternatively, if the data is to be read from a peer replicated store, then the requested one or more blocks 294 can be retrieved 295 by the RS daemon at that peer, from physical memory 296, using RDMA, and used to update 297 the replicated store at the requesting client, including persisting the requested blocks to physical memory, for use in provide the requested data.

In accordance with an embodiment, reading of data includes verifying that the latest replica list on the RS daemon is the same as that which the client already has, determining if the primary replica should be updated, and if so issuing an RDMA read for the requested block's index table entry. When the RDMA read returns data, a pointer is obtained to the block in the daemon's memory where the actual block is kept, and another RDMA read is issued from the daemon memory, to get the actual block into a user-provided block.

In accordance with an embodiment, a pseudo code to perform a data read is illustrated in Listing 4:

Listing 4

1. Check if the latest replica list on the RS daemon is same as that which the client already has.
2. If the latest replica list on the RS daemon is not the same as that which the client has, then get latest replica list from the RS daemon.
3. Determine if the primary replica needs to be updated if a new list was obtained in (step 2).
4. Issue an RDMA read for the requested block's index table entry.
5. Return to the client process.
6. Client process calls wait.
7. In the wait call, when the RDMA read returns data, obtain a pointer to the block in the RS daemon's memory where the actual block is kept.
8. Issue another RDMA read from RS daemon memory to get the actual block into a user-provided block.
9. Return to the client process.
10. Client process calls wait.
11. In the wait call, when the RDMA read completes, fire a notification callback to let the client process know that the read is complete.

As described above, in some situations the replicated store may optimize local transfer (i.e., transfer within a same processing node) of data using shared memory. In accordance with an embodiment, to improve performance when a replica is available on a same node as the client process, direct shared memory access can be used, including, for shared memory writes, modifying the write process described above so that, if one replica is in shared memory, then a simple memory-copy operation is used instead of RDMA.

For shared memory reads, if a replica is available on the same processing node as the client, then that replica can be used as the primary replica, and data memory-copied from shared memory into a user-provided buffer, and a return flag set appropriately to indicate that the data is immediately available.

Figure 7:
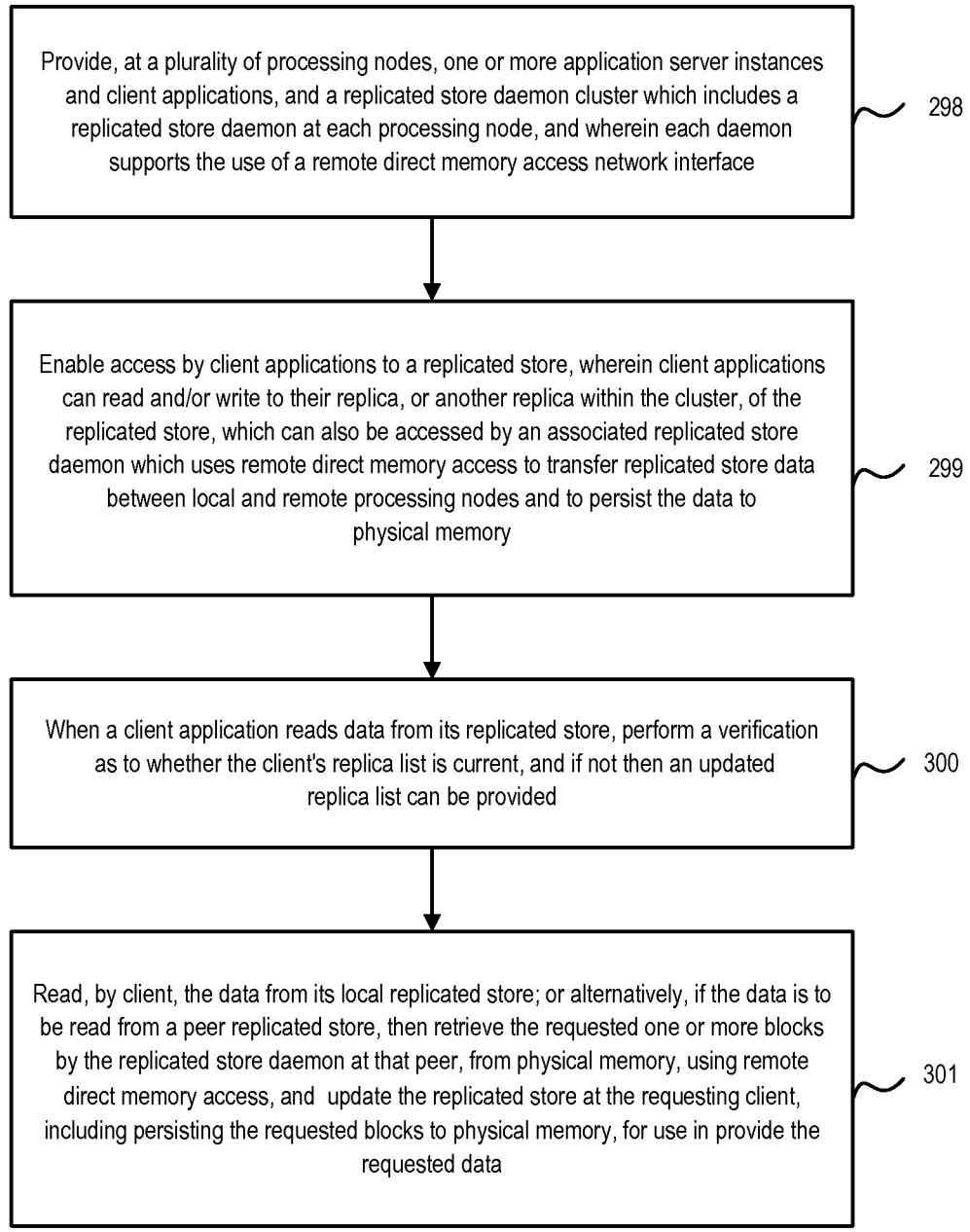
FIG. 7 illustrates a method of providing persistence of application data, including reading of data, in accordance with an embodiment.

FIG. 7 illustrates a method of providing persistence of application data, including reading of data, in accordance with an embodiment.

As shown in FIG. 7, at steps 298 and 299, a daemon cluster is again provided as generally described above, which enables client applications to read and/or write to their replica, or another replica within the cluster, of the replicated store.

At step 300, when a client application reads data from its replicated store, a verification is performed as to whether the client's replica list is current, and if not then an updated replica list can be provided.

At step 301, the client reads data from its local replicated store; or alternatively, if the data is to be read from a peer replicated store, retrieves the requested one or more blocks by the RS daemon at that peer, from physical memory, using RDMA, and updates the replicated store at the requesting client, including persisting the requested blocks to physical memory, for use in providing the requested data.

Resilvering of Replicated Stores

In accordance with an embodiment, resilvering is the process of creating a new synchronized copy of a replicated store, from an existing replicated store, to ensure that the system includes two copies of each replica associated with separate daemons.

For example, when a replicated store opens a new replica, its local RS daemon can be responsible for maintaining a first or primary copy of the replica, and a next available RS daemon can be responsible for maintaining a secondary copy of that replica.

In accordance with an embodiment, a resilvering process can be used to copy data from one processing node to another, if it is determined that the number of data replicas within a particular set of nodes may not be sufficient to meet the persistence requirements of a particular client application.

In accordance with an embodiment, the next available RS daemon can be determined by finding the primary's nearest subsequently-defined daemon that is up and running, within an rs_daemons.cfg file, or if the primary happens to be the last daemon in the file, then starting at the top of the rs_daemons.cfg file and looking for the next subsequently-defined daemon.

In accordance with an embodiment, when a replicated store opens an existing replica that has no pre-existing copy on the store's local RS daemon, but already has copies elsewhere in the cluster, then the open operation will succeed and one of the existing copies is resilvered to the local daemon as part of the replica open. Additionally, the replica's secondary can be resilvered to the next available daemon. This resilvering of the secondary helps ensure that replicas stay evenly distributed throughout a daemon cluster.

In accordance with an embodiment, if an RS daemon fails, then any attached client replicated store (for example, in a WebLogic environment, a WebLogic replicated store) would also fail. However, clients can recover their particular replica data by periodically attempting to reattach to the failed RS daemon or by attempting to attach to a different daemon in the same daemon cluster. The other daemons in the cluster detect the failure, and each of the failed daemon's primary and secondary replica copies can be automatically resilvered to another daemon.

Figure 8:
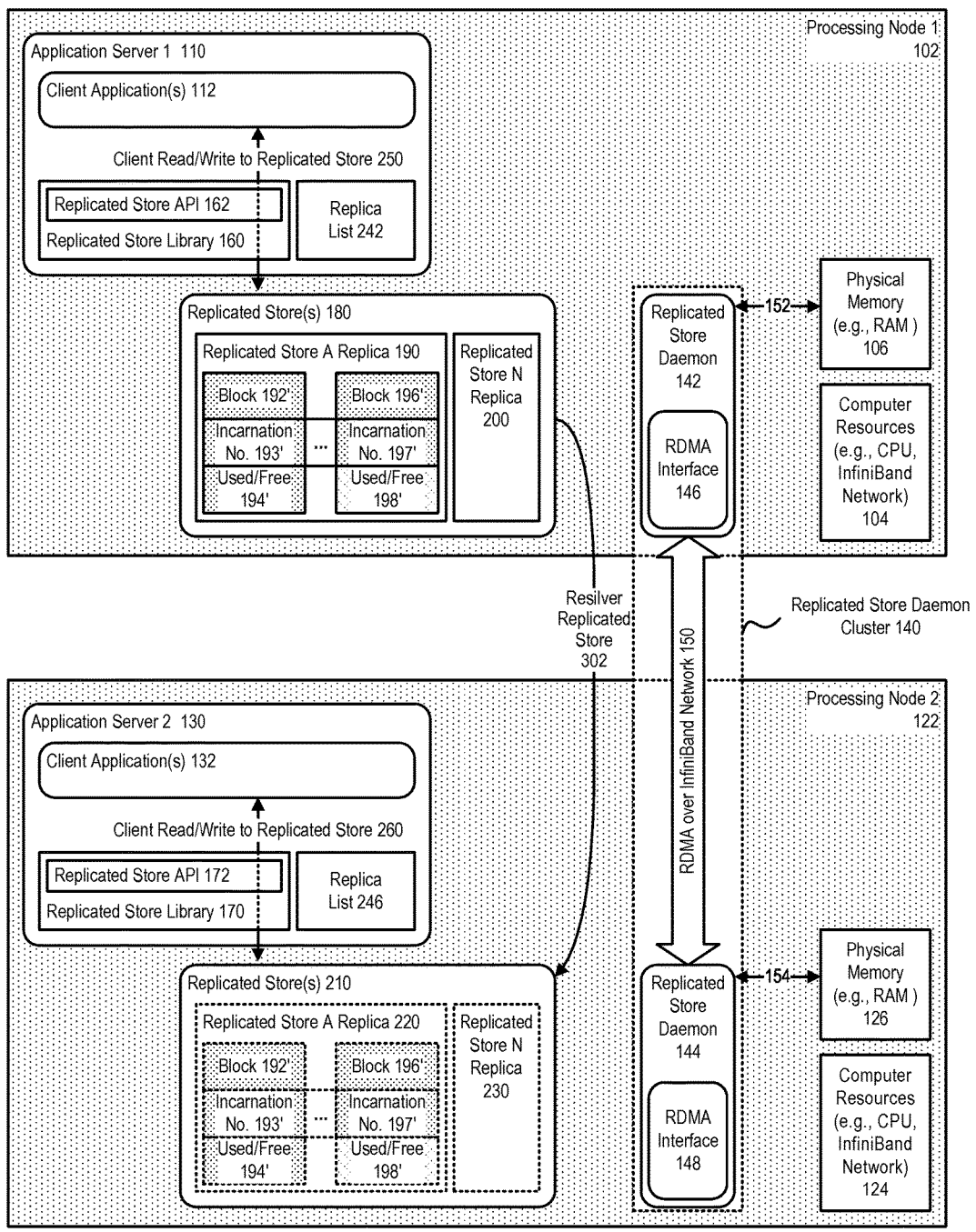
FIG. 8 further illustrates a system for persistence of application data, including resilvering, in accordance with an embodiment.

FIG. 8 further illustrates a system for persistence of application data, including resilvering, in accordance with an embodiment.

As shown in FIG. 8, in accordance with an embodiment, a source replicated store (including in this example, replicated store A, replicated store N, and their blocks of data) can be resilvered 302 to a target replicated store (including in this example, replicated store A replica 190', replicated store N replica 200').

In accordance with an embodiment, two forms of resilvering can be employed: resilvering when a replica is in a closed state, i.e., with no active writers to the replica; and resilvering when a replica is open, with a client actively writing to that replica.

In those situations in which the resilvering process is performed when a replica is in a closed state, it is expected that, when a resilvering is started then no client has it open. If an open is received from a client during resilvering, then that client will receive information about the new RS daemon to which the resilvering is happening. In some situations, the client may send all of its writes to all the replicas at the moment it opens the replica. In this case, all of the blocks in a current replica can be sent to a new replica, together with their block incarnation numbers. For each block, the receiving daemon will check if the block incarnation number is still the latest, and if so it will accept the block; otherwise it can simply discard that (stale) copy of the block.

In those situations in which the resilvering process is performed when a replica is open with a client actively writing to it, for example if the client had the replica opened when a resilvering starts, then at that point the client has stale information about the current set of RS daemons where the replicas are kept, and will not be able to send all writes to the new node, since the client and RS daemon works asynchronously. In such resilvering situations the RS daemon can take extra steps to synchronize such blocks into the new node.

For example, when the resilvering process starts, it can make note of the latest block incarnation number for the entire replica, for example 'x', and send an indicator to the client that the replica list has changed. Then the daemon sends each block in the replica to the remote daemon with each block's block incarnation number. Once all of these block sends are completed, the daemon waits for the client to acknowledge that it has received information about the latest replica. Once the client acknowledges that it has the latest set of replicas, the daemon will send writes from that point to all replicas.

If at this point, the client has written up to blocks with incarnation number 'y', then those remaining blocks written between incarnation numbers 'x' and 'y' may, or may not, have reached the destination replica. To ensure that all of these blocks are synchronized in the destination replica, all of those blocks are sent from the current RS daemon to any destination replicas. Once this set of messages are processed, both replicas will have the exact same copies of data.

Figure 9:
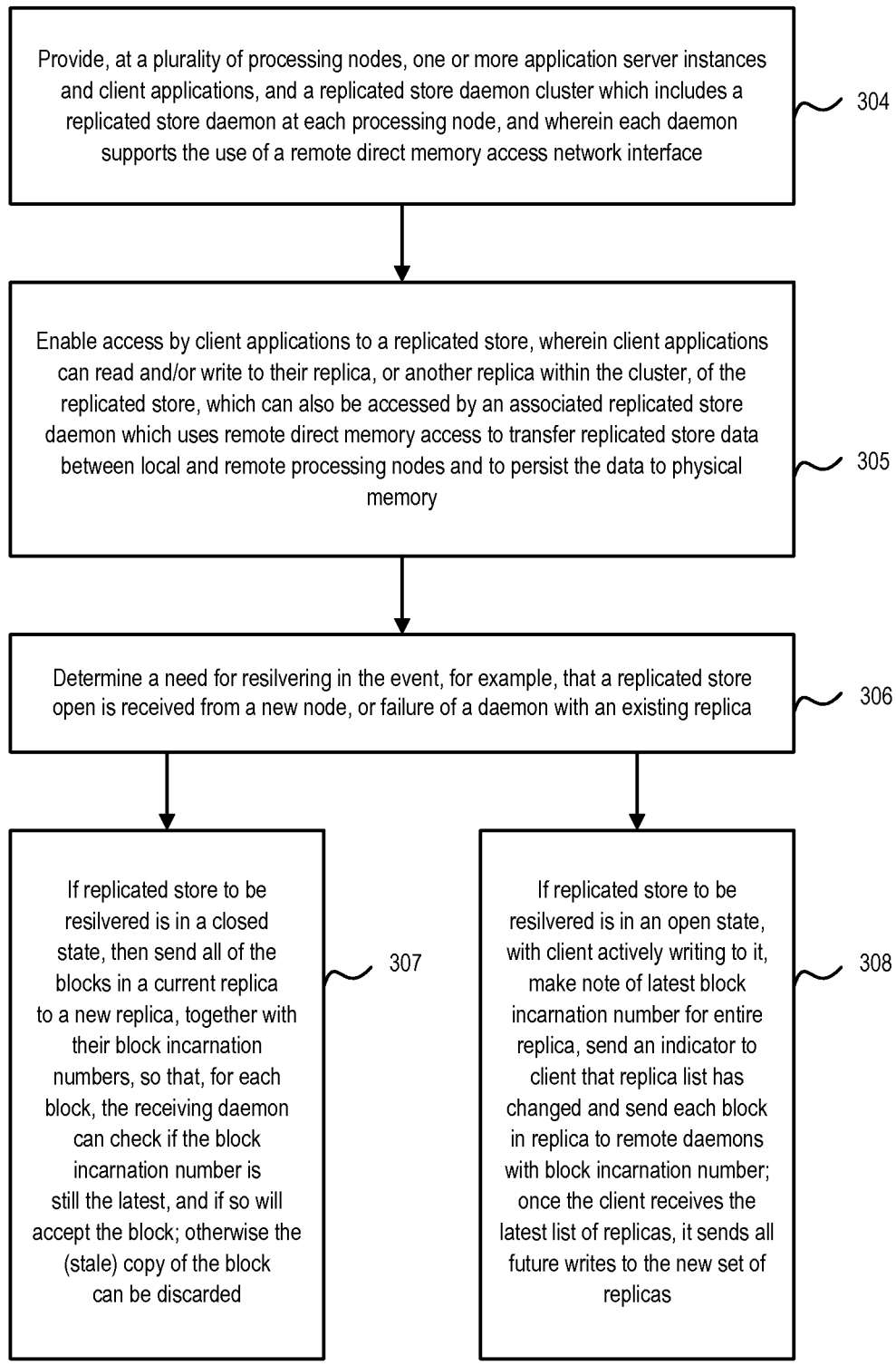
FIG. 9 illustrates a method of providing persistence of application data, including resilvering, in accordance with an embodiment.

FIG. 9 illustrates a method of providing persistence of application data, including resilvering, in accordance with an embodiment.

As shown in FIG. 9, at steps 304 and 305, a daemon cluster is again provided as generally described above, which enables client applications to read and/or write to their replica, or another replica within the cluster, of the replicated store.

At step 306, a need for resilvering is determined in the event, for example, that a replicated store open is received from a new node, or failure of an RS daemon with an existing replica.

At step 307, if the replicated store to be resilvered is in a closed state, then all of the blocks in a current replica can be sent to a new replica, together with their block incarnation numbers, so that, for each block, the receiving RS daemon can check if the block incarnation number is still the latest, and if so accept the block; otherwise the (stale) copy of the block can be discarded.

Alternatively, at step 308, if the replicated store to be resilvered is in an open state, with a client actively writing to it, then a note is made of the latest block incarnation number for the entire replica, and an indicator sent to the client that the replica list has changed, and each block in the replica sent to the remote RS daemons with block incarnation number. Once the client receives the latest list of replicas, it sends all future writes to the new set of replicas.

Replicated Store Data Layout

Figure 10A:
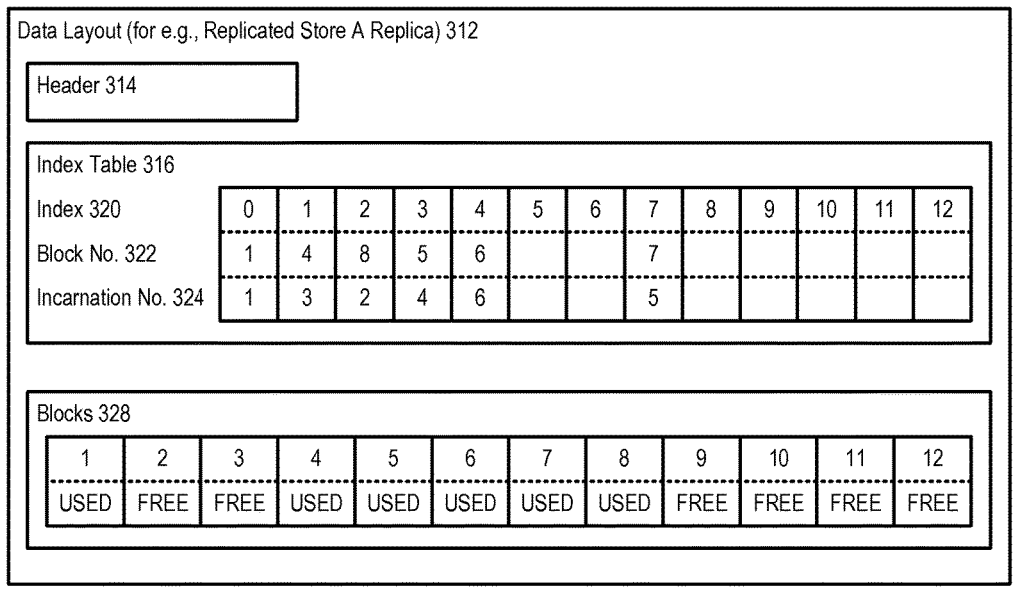
FIGS. 10A-10B illustrate an exemplary data layout and usage, in accordance with an embodiment.
Figure 10B:
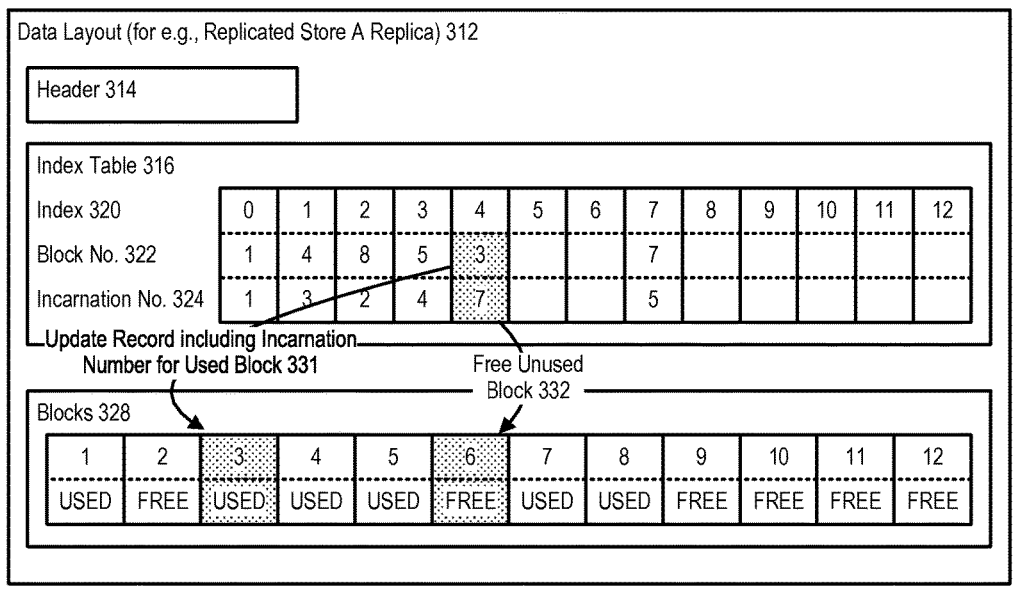

FIGS. 10A-10B illustrate an exemplary data layout and usage, in accordance with an embodiment.

In accordance with an embodiment, within each replicated store, client-provided data is maintained in blocks. Each replicated store comprises a plurality of replicas, with each replica being a chunk of memory formatted in a particular way, for example with a data layout 312 having a header 314, an index table 316 with index 320, block numbers 322 and incarnation numbers 324, and active and free blocks 328.

The header contains information about the replicated store, such as, for example store name, size, and block size.

Each entry in the index table contains a pointer to an active block, and an incarnation number of the block. If the pointer is null, then it is assumed that the block has not been written.

The block incarnation number is incremented each time that block is written, and is used during resilvering to determine if a node has the latest version of a particular block. Initially all of the blocks block are in a free state; as and when a new write is received from a client, the system can select blocks from the free list, copy data into the selected blocks, and put a corresponding entry into the index table.

FIG. 10A illustrates an exemplary state of data layout after the following data writes have happened in the order depicted:

The block at offset 0 was written, and the data resides at block 1.

The block at offset 1024 was written, and the data resides at block 8.

The block at offset 512 was written, and the data resides at block 4.

The block at offset 1536 was written, and the data resides at block 5.

The block at offset 3584 was written, and the data resides at block 7.

The block at offset 2048 was written, and the data resides at block 6.

FIG. 10B illustrates an exemplary state of data layout after the subsequent data writes have happened in the order depicted:

The block at offset 2048 was rewritten, and the data resides at block 3.

The block 6 is moved back to the free list.

As illustrated in FIG. 10B, the record for block number 3 (with incarnation number 7) is now indicated as used 331, while the record for block number 6, which is no longer unused, is now indicated as free 332.

Replicated Store Security

In accordance with an embodiment, the replicated store can enforce security restrictions or permissions that control how clients and users can access and use the replicated store, such as, for example:

User and/or group permissions: the replicated store can implement a first level of administrator and (normal) user privilege checks using file permissions. For example, an admin client secret can be written to a file that can only be read by a user with same user id as that running the RS daemon. Normal client secrets can be written to a file that can be read by a same user and same group. If a client is not able to read the appropriate file, then it will not be able to obtain a secret to connect to RS daemons.

Session-based permissions: at RS daemon startup, the daemon can generate admin and normal secrets using a true random generator provided by the operating system, which are then written to files. Any client which wants to connect to the replicated store as admin or as normal client can obtain a secret from these files, and send it to a predetermined port where the local RS daemon is listening. Once the client's authenticity is established, it can be given access to a secured port. Each message arriving at the secured port can be checked for an appropriate secret set in the header; if the received message does not include a proper secret, then it can be dropped without processing.

Replica-based permissions: when a replica is opened, a new secret can be created for that open session with a true random generator. The secret can be passed back to the client for use during authentication. When an update to the replica is received by an RS daemon, it will check against this secret before authorizing an update.

The above-described methods of enforcing security restrictions or permissions security permissions are provided by way of example, to illustrate a particular embodiment. In accordance with other embodiments, other methods of enforcing security restrictions or permissions can be used.

Exemplary Replicated Store usage within a Cluster

Figure 11:
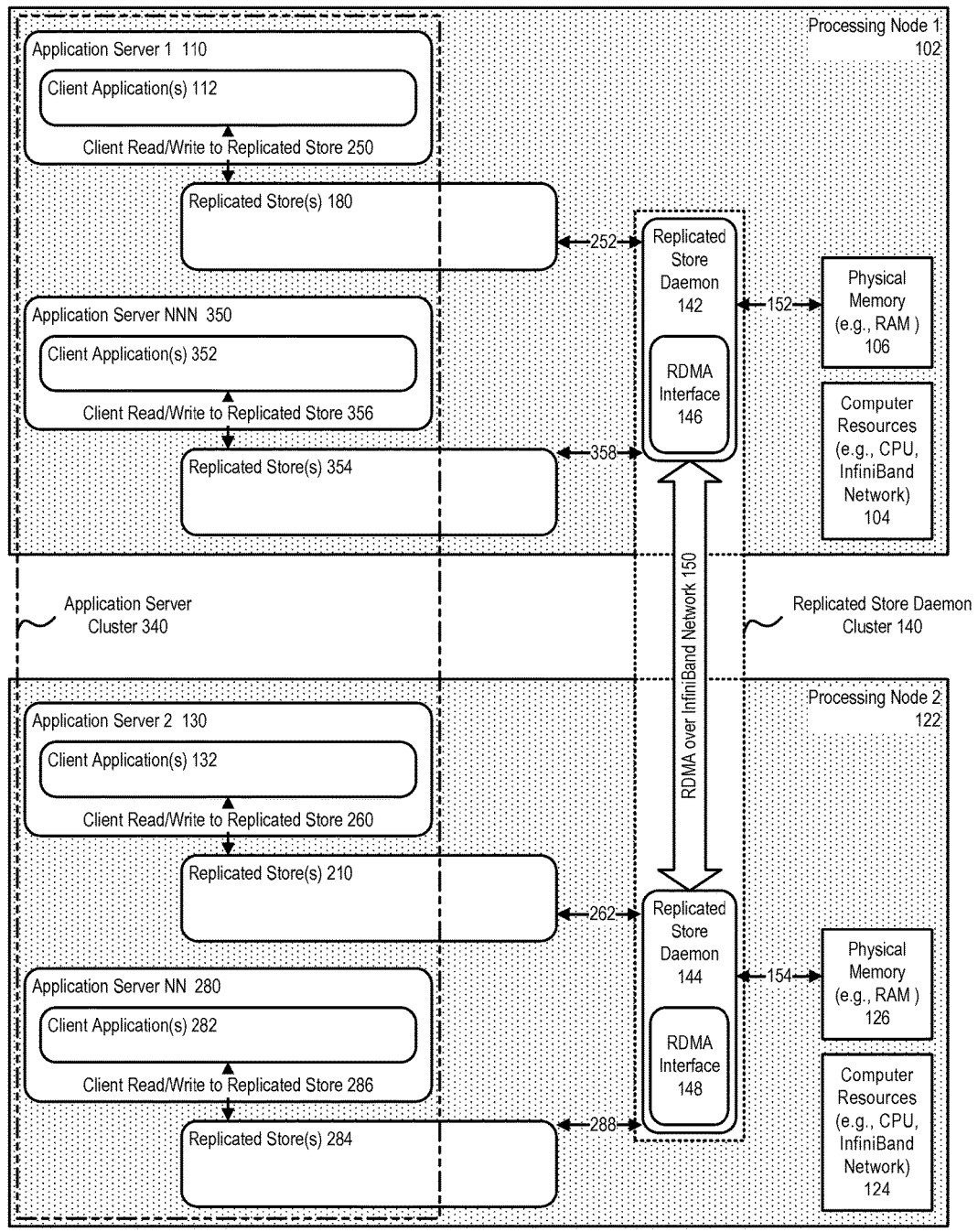
FIG. 11 illustrates an example usage of a system for persistence of application data, in accordance with an embodiment.

FIG. 11 illustrates an example usage of a system for persistence of application data, in accordance with an embodiment.

As shown in FIG. 11, in accordance with an embodiment, an application server cluster 340 can be configured to include a plurality of application server instances, in this example, application server 1, application server 2, application server NN, and application server NNN. Each processing node can include a plurality of application server and client applications as described above, in this example further including application server NNN 350 with client applications 352, and replicated store 354 to which the client applications can read/write 356, and which can be accessed 358 by the associated RS daemon.

Figure 12:
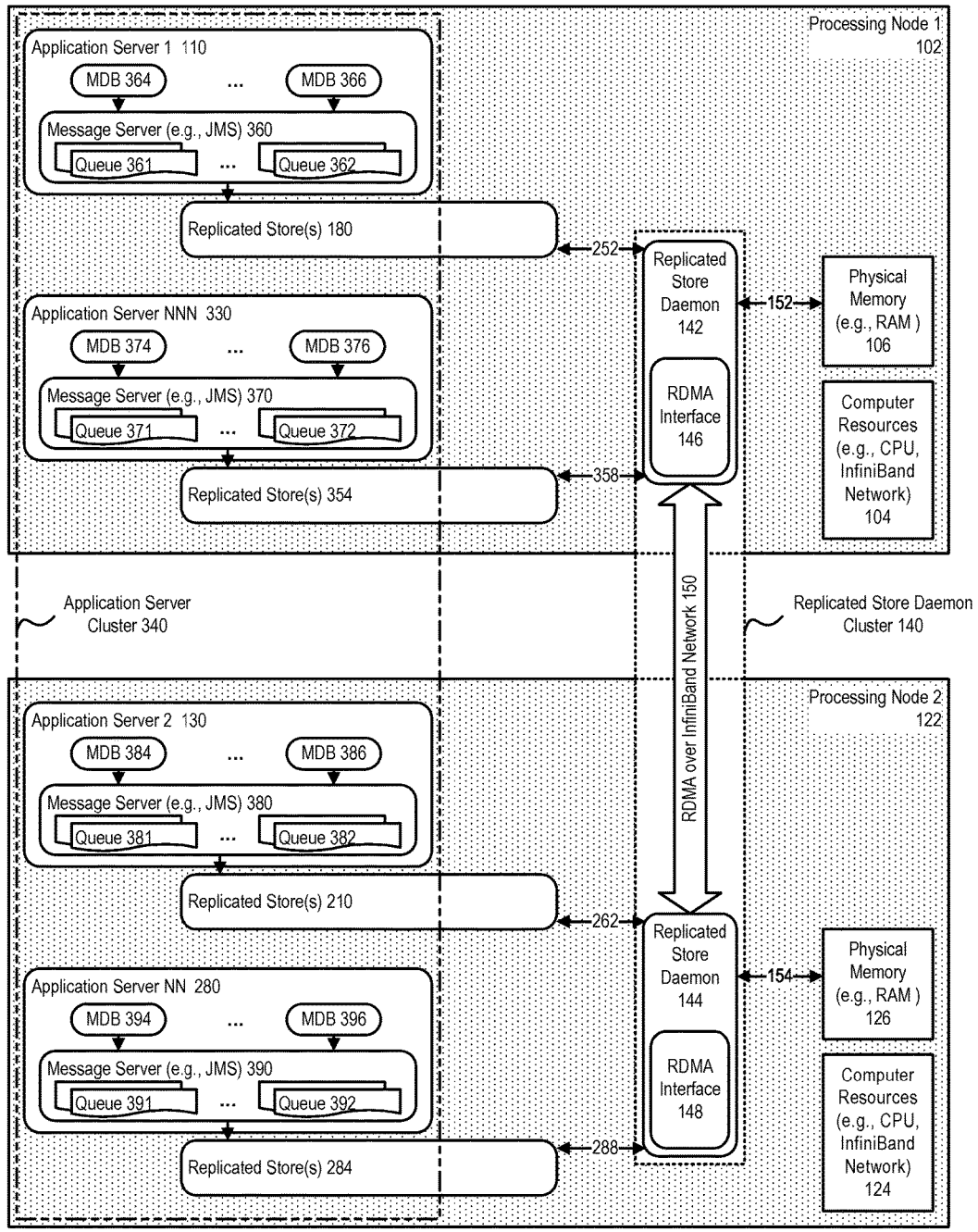
FIG. 12 illustrates another example usage of a system for persistence of application data, in accordance with an embodiment.

FIG. 12 illustrates another example usage of a system for persistence of application data, in accordance with an embodiment.

As shown in FIG. 12, in accordance with an embodiment, in a WebLogic environment, messaging services such as JMS 360, 370, 380, 390, having queues 361, 362, 371, 372, 381, 382, 391, 392, and associated with message driven beans (MDB) 364, 366, 374, 376, 384, 386, 394, 396, can use replicated stores as a high performance alternative to file-based or JDBC storage options. A replicated store can store client JMS data in local node memory, and replicate that data to memory on a second node, with support for high-availability, and yielding linearly-scalable performance.

For even higher availability, in a WebLogic environment, a WebLogic replicated store can be migrated along with its parent application server instance as part of a WebLogic Whole Server Migration (WSM), which provides automatic and manual migration at the server level, rather than on the service level, and automatically restarts or migrates failed WebLogic replicated stores. When a JMS server instance fails, its replicated store can be recovered by restarting on any machine that hosts a running RS daemon in its daemon cluster.

A WebLogic replicated store can also be migrated as part of Automatic Service Migration (ASM). Service-level migration is controlled by a migratable target, which serves as a grouping of JMS-related services, and which is hosted on only one physical server in a cluster. Such hosted services can be automatically migrated from an unhealthy hosting server to a healthy active server, with the help of WebLogic's Health Monitoring subsystem.

The above-described usage within a WebLogic environment, including the use of JMS services, is provided by way of example, to illustrate a particular embodiment. In accordance with other embodiments, the system and method can be used with other types of application server environment, cloud, or other enterprise environment.

Replicated Store Application Program Interface (API)

As described above, in accordance with an embodiment, each application server can include a replicated store library which enables access by that application server's client applications to a replicated store (replica). An example of a replicated store API for use with a native library, including client-side interfaces and functions, is further described below. In accordance with other embodiments, other types of client-side interfaces and functions can be supported.

Initialize/Delete Context Interface

In accordance with an embodiment, before performing an operation with the replicated store, clients must initialize a replicated store client context, which will be used by later operations. The initialization function's arguments can be used to specify the location of a replicated store configuration file and a listen endpoint of the local RS daemon. During initialization, the client talks to the local daemon, authenticates itself, and obtains access to an endpoint that is available only to authorized clients. If the operation fails during context initialization, an appropriate error is returned:

cs_client_ctx *cs_init(cs_rqs *rqs, cs_init_args *args);
IN: args—initialization parameters for the context.
OUT: rqs—status of the operation.
RETURNS: pointer to client context; if NULL, then initialization failed.

In accordance with an embodiment, once a client is finished using a replicated store, it can disassociate with the RS daemon using a delete context function, which cleans up resources allocated for that particular context on the client and the daemon side:

void cs_fini(cs_rqs *rqs, cs_client_ctx *ctx);
IN: ctx—pointer to context.
OUT: rqs—status of the operation.
RETURNS: none.

Create/Open Replicated Store Interface

In accordance with an embodiment, once a context has been created, the next step is to create/open a replicated store. Each replicated store can be named using a string. Internally, the open operation checks if the replicated store is already opened by another client, and if so fails the call. It then selects RS daemons on which replicas should be placed, for example based on the availability of free memory in closest daemons. If a replicated store needs to be created, then empty replicas are created on selected processing nodes. If a replicated store already exists, then replicas can be resilvered to newly selected RS daemons from old RS daemons. The details regarding all replicas are then returned to the client.

In accordance with an embodiment, the RS daemon considered to be the closest daemon is the one listed next to the local RS daemon in the configuration file. The client internally selects the closest replica as the primary replica. If the primary replica is on the current node as that on which the client resides, then data reads will be be optimized using shared memory reads:

cs_store_handle cs_opensstore(cs_rqs *rqs,
cs_client_ctx *ctx, char *storename, int minredundancy,
int redundancy, ub4 flags, size_t storesize, ub4 blocksize);
IN: ctx—pointer to context.
IN: storename—name of the replicated store to be created/opened, up to 255 chars.
IN: minredundancy—minimum redundancy (no. of replicas) required to be maintained.
IN: redundancy—preferred level of redundancy or number of replicas.
IN: flags—different flags to control create/open behaviour.
IN: storesize—size of replicated store in bytes.
IN: blocksize—size of each block (multiple of 2 between 512 to 1 MB).
OUT: rqs—status of the operation.
RETURNS: handle to the replicated store.

Block Read/Write Interface

In accordance with an embodiment, transfer of data can be driven by an RDMA engine associated with the system's network interface card. If a preregistered buffer is provided to the read/write interface, then all remote data transfer will use RDMA to/from remote replicas. Registering IO buffers allows clients to take advantage of RDMA:

cs_key *cs register(cs_rqs *rqs, cs_client_ctx *ctx, void *va, size_t len, ub4 flags);
IN: ctx—pointer to context.
IN: va—address of buffer to be registered with NIC.
IN: len—length of buffer to be registered.
IN: flags—flags to modify registration method.
OUT: rqs—status of the operation.
RETURNS: pointer to a hardware key that can be later passed read/write calls.

In accordance with an embodiment, once an IO is completed, the registered buffer can be unregistered. This helps the operating system to unlock memory pinned to RAM during registration. Since registration and unregistration are costly operations, registered buffers can be reused where possible:

void cs_unregister(cs_rqs *rqs, cs_client_ctx *ctx, cs_key *key, ub4 flags);
IN: ctx—pointer to context.
IN: key—pointer to hardware key (returned by an earlier register call).
IN: flags—flags to modify unregister method.
OUT: rqs—status of the operation.
RETURNS: none.

Asynchronous Read/Write Interface

In accordance with an embodiment, reads and writes can be performed at block boundaries. The client provides information about which replica to read from or write to, and the location of user data. Reads and writes can also be performed to multiple blocks in a single call. All read/write operations are asynchronous, and return immediately after submitting an operation to the replicated store client layer. The results of the operation are given back to the client using a notification callback fired from wait routines.

Internally, a read operation works by checking if the primary replica is local to the node, and if so then a memcopy requests blocks from shared memory and returns with indication that the read is completed and data is available. If instead, the primary replica is remote, then an RDMA read is initiated, and returns to the client with an indication that the read is in progress. The client can call a wait routine to get the callback indicating that the read is completed:

void cs_read(cs_rqs *rqs, cs_client_ctx *ctx, cs_client_opargs *opargs);
IN: ctx—pointer to context.
IN: opargs—details of read operation such as replicated store handle, blocks to read, read buffer.
OUT: rqs—status of the operation.
RETURNS: none.

Internally, a write operation works by, for each replica, checking if the replica is local, and if so then memcopying blocks to required blocks. Otherwise an RDMA write is initiated to remote nodes, which returns inprogress if RDMA was initiated, or else returns 'done'. The client can call wait in the event that inprogress was returned:

void cs_write(cs_rqs *rqs, cs_client_ctx *ctx, cs_client_opargs *opargs);
IN: ctx—pointer to context.
IN: opargs—details of write operation such as replicated store handle, blocks to write, write buffer.
OUT: rqs—status of the operation.
RETURNS: none.

Hardware-Accelerated Write Interface

In accordance with an embodiment, typical writes require remote RS daemons to acknowledge the client that it has data written to a replicated store through a network endpoint. This acknowledgement can be delayed if an RS daemon is heavily loaded by requests from different clients. The replicated store can support hardware acknowledgement of an RDMA completion generated by a network interface card, to be used as an indication that the data is placed in the replicated store. In this way, the replicated store client can commit a write even though the RS daemon is busy with some other work.

Hardware-accelerated writes allow clients to progress even before an RS daemon has processed the written data. This can potentially lead to a situation where a read is attempted just after an accelerated write, as all the data written by previous accelerated writes may not be ready yet for the read. Clients can avoid this by using a fence API, which forces all RS daemons to commit all the previous writes on the same replicated store:

void cs_read_fence(cs_rqs *rqs, cs_client_ctx *ctx, cs_client_opargs *opargs);
IN: ctx—pointer to context.
IN: opargs—replicated store handle on which fence operation needs to be applied.

Wait Interface

In accordance with an embodiment, since many replicated store operations are asynchronous, a client can be informed as to when an operation has completed using the wait interface. During a wait, the replicated store internally checks which operations are complete, and calls notification callbacks on them. When a multiblock read/write is submitted to the replicated store, it is internally split into smaller pieces and issued to hardware separately. Whenever there are operations outstanding, wait operations can be called periodically to let the replicated store layer perform its background tasks:

void cs_wait(cs_rqs *rqs, cs_client_ctx *ctx, ub4 timeout, ub4 busywait);
IN: ctx—pointer to context.
IN: timeout—timeout in millisecs.

IN: busywait—do busy wait for given number of microseconds.
OUT: rqs—status of the operation.

Truncate Interface

In accordance with an embodiment, a truncate interface enables a client to discard a number of blocks at the end of a replicated store with a single call:

void cs_resizestore(cs_rqs *rqs, cs_client_ctx *ctx, cs_store_handle handle, size_t storesize);
IN: ctx—pointer to context.
IN: handle—handle to the replicated store to be resized.
IN: storesize—new size of replicated store.
OUT: rqs—status of the operation.

Close Interface

In accordance with an embodiment, a close interface enables a client to close a replicated store:

void cs_closestore(cs_rqs *rqs, cs_client_ctx *ctx, cs_store_handle handle, ub4 flags);
IN: ctx—pointer to context.
IN: handle—handle to the replicated store to be closed.
IN: flags—modifiers.
OUT: rqs—status of the operation.

Delete Interface

In accordance with an embodiment, a delete interface enables a client to delete a replicated store, so that resources associated with that replicated store can be freed for use by other nodes:

void cs_deletestore(cs_rqs *rqs, cs_client_ctx *ctx, char *storename, ub4 flags);
IN: ctx—pointer to context.
IN: storename—name of the replicated store to be deleted.
IN: flags—modifiers.
OUT: rqs—status of the operation.

Information Interfaces

In accordance with an embodiment, interfaces can be provided that enable querying of information regarding the RS daemons and replicated stores, for example information about the size of a replicated store, currently used size, blocksize, time or creation, access, modification, primary replica node, configured redundancy, current nodes. A callback is fired with storeinfo details if a given replicated store exists:

void cs_get_storeinfo1(cs_rqs *rqs, cs_client_ctx *ctx, char *storename, ub8 cookie, cs_client_si_cb cb, boolean verbose);
IN: ctx—pointer to context.
IN: storename—name of the replicated store.
IN: cookie—identifier that is passed back to client during callback.
IN: cb—callback to be called when storeinfo details are available.
OUT: rqs—status of the operation.

In accordance with an embodiment, an interface enables enumerating replicated stores in the local node's RS daemon instance. If there are n replicated stores in the current node, then a callback with the information is fired n times. Each invocation of the callback provides information about a different replicated store:

void cs_enumerate_stores(cs_rqs *rqs, cs_client_ctx *ctx, ub8 cookie, cs_client_si_cb cb, boolean verbose);
IN: ctx—pointer to context.
IN: cookie—identifier that is passed back to client during callback.
IN: cb—callback to be called when storeinfo details are available.
OUT: rqs—status of the operation.

In accordance with an embodiment, an interface enables enumerating replicated stores in the entire replicated store. If there are n replicated stores in the replicated store, then a callback with the information is fired n times. Each invocation of the callback provides information about a different replica:

void cs_enumerate_global_stores(cs_rqs *rqs, cs_client_ctx *ctx, ub8 cookie, cs_client_si_cb cb, boolean verbose);
IN: ctx—pointer to context.
IN: cookie—identifier that is passed back to client during callback.
IN: cb—callback to be called when storeinfo details are available.
OUT: rqs—status of the operation.

In accordance with an embodiment, an interface enables receiving information about a local RS daemon, such as local daemon, current time, configured memory, used memory:

void cs_get_local_daemon_info(cs_rqs *rqs, cs_client_ctx *ctx, cs_ldinfo *ldinfo);
IN: ctx—pointer to context.
OUT: ldinfo—information about local daemon.

Administration Interfaces

Administration interfaces require admin privilege to execute, which typically means the client should be using same user id as the RS daemon. In order to execute administration commands on another, remote RS daemon, the client can attach to the remote RS daemon using a special API after connecting to a local RS daemon:

int cs_admin_get_attached_daemon(cs_rqs *rqs, cs_client_ctx *ctx);
IN: ctx—pointer to context.
OUT: rqs—status of the operation.
RETURNS: index of currently attached daemon.

void cs_admin_attach_daemon(cs_rqs *rqs, cs_client_ctx *ctx, int dindex);
IN: ctx—pointer to context.
IN: dindex—index of the daemon to be attached to.
OUT: rqs—status of the operation.

In accordance with an embodiment, an RS daemon shutdown can be triggered using an API. With a normal shutdown, replicas are deleted on a local node and the attached RS daemon is shut down. If any of the replicated stores in the attached RS daemon are open, then the shutdown operation returns with an error. This can cause data loss as the shutdown proceeds to delete even the last replica if none of the replicated stores are open. With a safe shutdown, a local replica is replicated to a remote node, and the RS daemon is shut down. If relocation cannot be performed, then the system waits until some memory is available on other nodes to do this, which avoids data loss. With a force shutdown, everything is discarded and shut down, which can cause data loss.

void cs_admin_shutdown_daemon(cs_rqs *rqs, cs_client_ctx *ctx, ub4 flags);
IN: ctx—pointer to context.
IN: flags—indicate what type of shutdown is required.
OUT: rqs—status of the operation.

In accordance with an embodiment, an interface enables enumerating replicated stores, to query the status of each RS daemon in the replicated store, such as how much memory is configured, how much is used, and number of open replicated stores. If there are n RS daemons configured in the replicated store then the provided callback is called n times to provide details about each individual RS daemon.

```
void cs_admin_enumerate_daemons(cs_rqs *rqs, cs_cli-
    ent_ctx *ctx, ub8 cookie, cs_client_di_cb cb, boolean
    verbose);
IN: ctx—pointer to context.
IN: cookie—identifier that is passed back to client during
    callback.
IN: cb—callback to be called when daemon info is
    available.
OUT: rqs—status of the operation.
```

In accordance with an embodiment, an interface enables enumerating replicated stores, to query the status of all replicas that are present in a particular RS daemon, or in the entire replicated store. Clients can also obtain details about a particular replicated store, such as size, blocksize, who has opened it, and replica locations.

```
void cs_admin_enumerate_stores(cs_rqs *rqs, cs_cli-
    ent_ctx *ctx, ub8 cookie, cs_client_si_cb cb, boolean
    verbose);
IN: ctx—pointer to context.
IN: cookie—identifier that is passed back to client during
    callback.
IN: cb—callback to be called when storeinfo details are
    available.
OUT: rqs—status of the operation.
void cs_admin_enumerate_global_stores(cs_rqs  *rqs,
    cs_client_ctx *ctx, ub8 cookie, cs_client_si_cb cb,
    boolean verbose);
IN: ctx—pointer to context.
IN: cookie—identifier that is passed back to client during
    callback.
IN: cb—callback to be called when storeinfo details are
    available.
OUT: rqs—status of the operation.
void cs_admin_get_storeinfo(cs_rqs *rqs, cs_client_ctx
    *ctx, char *storename, ub8 cookie, cs_client_si_cb cb,
    boolean verbose);
IN: ctx—pointer to context.
IN: storename—name of the replicated store.
IN: cookie—identifier that is passed back to client during
    callback.
IN: cb—callback to be called when storeinfo details are
    available.
OUT: rqs—status of the operation.
```

In accordance with an embodiment, when a client is finished with a particular replicated store, it can be deleted from the replicated store to free up resources. Under a normal scenario, the replicated store allows deleting replicated stores that are not currently open. If a special "force" flag is indicated, then it is deleted even if it is still open. The client that had it opened will be notified later that the replicated store no longer exists.

```
void cs_admin_delete_store(cs_rqs *rqs, cs_client_ctx
    *ctx, char *storename, boolean force);
IN: ctx—pointer to context.
IN: storename—name of the replicated store to be deleted.
IN: flags—modifiers.
OUT: rqs—status of the operation.
```

The above replicated store API, including client-side interfaces and functions, is provided by way of example to illustrate a particular embodiment. In accordance with other embodiments, other types of API, client-side interfaces and functions can be provided.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for enabling persistence of application data, using replication over a remote direct memory access (RDMA) network, comprising:
    a first processing node and a second processing node, wherein the first and second processing nodes each include a processor, a physical memory, and an RDMA network interface, and each execute an application server instance and client applications of the application server instance;
    a first replicated store held in the physical memory of the first processing node that stores a first copy of a data replica, wherein the first copy of the data replica has a data layout including a first plurality of writable data blocks, wherein the first plurality of writable data blocks are associated with a first index table, wherein a column of the first index table includes a first index offset, a first pointer, and a first incarnation number, and wherein the first plurality of data blocks is associated with a first list that indicates whether each of the first plurality of data blocks is used or is free;
    a second replicated store held in the physical memory of the second processing node that stores a second copy of a data replica, wherein the second copy of the data replica has a data layout including a second plurality of writable data blocks, wherein the second plurality of writable data blocks are associated with a second index table, wherein a column of the second index table includes a second index offset, a second pointer, and a second incarnation number, and wherein the second plurality of data blocks is associated with a second list indicating whether each of the second plurality of data blocks is used or is free;
    a first replicated store daemon operating at, and associated with, the first processing node, wherein the first replicated store daemon supports the use of the RDMA network interface at the first processing node; and a second replicated store daemon operating at, and associated with, the second processing node, wherein the second replicated store daemon supports the use of the RDMA network interface at the second processing node;

wherein a client application of the application server instance executing on the first processing node writes application data to a first writable data block of the first plurality of writable data blocks that is indicated as free by the first list, and wherein the first replicated store daemon updates the value of the first pointer in the column of the first index table to point to the first writable data block, and increments the value of the incarnation number in the column of the first index table;

wherein, the replicated store daemon associated with the first processing node sends, via the RDMA network interface of the first processing node and the RDMA network interface of the second processing node, the application data and the column of the first index table to the second replicated store daemon associated with the second processing node; and wherein the second replicated store daemon compares the first incarnation number of the column of the first index table with the second incarnation number of the column of the second index table to determine that the first incarnation number of the column of the first index table has been incremented, writes the application data to a second free writable data block of the second plurality of data blocks, changes the value of the second pointer of the column of the second index table to match the value of the first pointer of the column of the first index table, and increments the value of the second incarnation number of the column of the second index table.

2. The system of claim 1, wherein the first index table includes a column for each writable data block in the first plurality of writable data blocks.

3. The system of claim 1, wherein the index table includes an index offset for each writable data block in the first plurality of writable data blocks.

4. The system of claim 1, wherein a resilvering by the first replicated store daemon to copy the first replicated store to a third replicated store held in the memory of a third processing node is performed if it is determined by the first replicated store daemon that the second replicated store daemon has failed.

5. The system of claim 1, wherein the client application of the application server instance executing on the first processing node uses an application programming interface (API) of the application server instance executing on the first processing node to access the first replicated store.

6. The system of claim 1, wherein the RDMA network is an RDMA-over-InfiniBand network.

7. The system of claim 1, wherein the associated replicated store daemon allocates and exposes physical random access memory of the processing node.

8. The system of claim 7, wherein the included RDMA network interface enables read and write access to the allocated and exposed physical random access memory of the processing node.

9. A method of enabling persistence of application data, using replication over a remote direct memory access (RDMA) network, comprising:

executing, at a first processing node and a second processing node, wherein the first and second processing nodes each include a processor, a physical memory, and an RDMA network interface, a first application server instance at the first processing node and a second application server instance at the second processing node and client applications of the first application server instance at the first processing node and client applications of the second application instance at the second processing node;

providing a first replicated store held in the physical memory of the first processing node that stores a first copy of a data replica, wherein the first copy of the data replica has a data layout including a first plurality of writable data blocks, wherein the first plurality of writable data blocks are associated with a first index table, wherein a column of the first index table includes a first index offset, a first pointer, and a first incarnation number, and wherein the first plurality of data blocks is associated with a first list that indicates whether each of the first plurality of data blocks is used or is free:

providing a second replicated store held in the physical memory of the second processing node that stores a second copy of a data replica, wherein the second copy of the data replica has a data layout including a second plurality of writable data blocks, wherein the second plurality of writable data blocks are associated with a second index table, wherein a column of the second index table includes a second index offset, a second pointer, and a second incarnation number, and wherein the second plurality of data blocks is associated with a second list indicating whether each of the second plurality of data blocks is used or is free;

associating a first replicated store daemon with the first processing node and a second replicated store daemon with the second processing node, wherein the first replicated store daemon operates at the first processing node and supports the use of the RDMA network interface at the first processing node, and the second replicated store daemon operates at the second processing node and supports the use of the RDMA network interface at the second processing node;

writing, by a client application of the application server instance executing on the first processing node, application data to a first writable data block of the first plurality of writable data blocks that is indicated as free by the first list;

updating, by the first replicated store daemon, the value of the first pointer in the column of the first index table to point to the first writable data block;

incrementing, by the first replicated store daemon, the value of the incarnation number in the column of the first index table;

sending, by the replicated store daemon associated with the first processing node and via the RDMA network interface of the first processing node and the RDMA network interface of the second processing node, the application data and the column of the first index table to the second replicated store daemon associated with the second processing node;

comparing, by the second replicated store daemon, the first incarnation number of the column of the first index table with the second incarnation number of the column of the second index table to determine that the first incarnation number of the column of the first index table has been incremented;

writing, by the second replicated store daemon, the application data to a second free writable data block of the second plurality of data blocks;

changing, by the second replicated store daemon, the value of the second pointer of the column of the second index table to match the value of the first pointer of the column of the first index table; and incrementing, by the second replicated store daemon, the value of the second incarnation number of the column of the second index table.

10. The method of claim 9, wherein the first index table includes a column for each writable data block in the first plurality of writable data blocks.

11. The method of claim 9, wherein the index table includes an index offset for each writable data block in the first plurality of writable data blocks.

12. The method of claim 9, wherein a resilvering by the first replicated store daemon to copy the first replicated store to a third replicated store held in the memory of a third processing node is performed if it is determined by the first replicated store daemon that the second replicated store daemon has failed.

13. The method of claim 9, wherein the client application of the application server instance executing on the first processing node uses an application programming interface (API) of the application server instance executing on the first processing node to access the first replicated store.

14. The method of claim 9, wherein the RDMA network is an RDMA-over-InfiniBand network.

15. The method of claim 9, wherein the associated replicated store daemon allocates and exposes physical random access memory of the processing node.

16. A non-transitory computer readable storage medium, including instructions stored thereon which when read and executed by one or more computers cause the one or more computers to perform the steps comprising:

executing, at a first processing node and a second processing node, wherein the first and second processing nodes each include a processor, a physical memory, and an RDMA network interface, a first application server instance at the first processing node and a second application server instance at the second processing node and client applications of the first application server instance at the first processing node and client applications of the second application instance at the second processing node;

providing a first replicated store held in the physical memory of the first processing node that stores a first copy of a data replica, wherein the first copy of the data replica has a data layout including a first plurality of writable data blocks, wherein the first plurality of writable data blocks are associated with a first index table, wherein a column of the first index table includes a first index offset, a first pointer, and a first incarnation number, and wherein the first plurality of data blocks is associated with a first list that indicates whether each of the first plurality of data blocks is used or is free;

providing a second replicated store held in the physical memory of the second processing node that stores a second copy of a data replica, wherein the second copy of the data replica has a data layout including a second plurality of writable data blocks, wherein the second plurality of writable data blocks are associated with a second index table, wherein a column of the second index table includes a second index offset, a second pointer, and a second incarnation number, and wherein the second plurality of data blocks is associated with a second list indicating whether each of the second plurality of data blocks is used or is free;

associating a first replicated store daemon with the first processing node and a second replicated store daemon with the second processing node, wherein the first replicated store daemon operates at the first processing node and supports the use of the RDMA network interface at the first processing node, and the second replicated store daemon operates at the second processing node and supports the use of the RDMA network interface at the second processing node;

writing, by a client application of the application server instance executing on the first processing node, application data to a first writable data block of the first plurality of writable data blocks that is indicated as free by the first list;

updating, by the first replicated store daemon, the value of the first pointer in the column of the first index table to point to the first writable data block;

incrementing, by the first replicated store daemon, the value of the incarnation number in the column of the first index table;

sending, by the replicated store daemon associated with the first processing node and via the RDMA network interface of the first processing node and the RDMA network interface of the second processing node, the application data and the column of the first index table to the second replicated store daemon associated with the second processing node;

comparing, by the second replicated store daemon, the first incarnation number of the column of the first index table with the second incarnation number of the column of the second index table to determine that the first incarnation number of the column of the first index table has been incremented;

writing, by the second replicated store daemon, the application data to a second free writable data block of the second plurality of data blocks;

changing, by the second replicated store daemon, the value of the second pointer of the column of the second index table to match the value of the first pointer of the column of the first index table; and incrementing, by the second replicated store daemon, the value of the second incarnation number of the column of the second index table.

17. The non-transitory computer readable storage medium of claim 16, wherein the first index table includes a column for each writable data block in the first plurality of writable data blocks.

18. The non-transitory computer readable storage medium of claim 16, wherein the index table includes an index offset for each writable data block in the first plurality of writable data blocks.

19. The non-transitory computer readable storage medium of claim 16, wherein a resilvering by the first replicated store daemon to copy the first replicated store to a third replicated store held in the memory of a third processing node is performed if it is determined by the first replicated store daemon that the second replicated store daemon has failed.

20. The non-transitory computer readable storage medium of claim 16, wherein the client application of the application server instance executing on the first processing node uses an application programming interface (API) of the application server instance executing on the first processing node to access the first replicated store.

* * * * *

UNITED STATES PATENT AND TRADEMARK OFFICE
CERTIFICATE OF CORRECTION

PATENT NO. : 10,318,475 B2
APPLICATION NO. : 14/749503
DATED : June 11, 2019
INVENTOR(S) : Kaimalettu et al.

Page 1 of 1

It is certified that error appears in the above-identified patent and that said Letters Patent is hereby corrected as shown below:

In the Claims

In Column 22, Line 22, in Claim 9, delete "free:" and insert -- free; --, therefor.

Signed and Sealed this
Twenty-eighth Day of July, 2020

Andrei Iancu
*Director of the United States Patent and Trademark Office*